(12) United States Patent
Emmerich

(10) Patent No.: US 10,514,056 B2
(45) Date of Patent: Dec. 24, 2019

(54) FASTENERS AND METHODS RELATING TO SAME

(71) Applicant: Scott J. Emmerich, Delavan, WI (US)

(72) Inventor: Scott J. Emmerich, Delavan, WI (US)

( * ) Notice: Subject to any disclaimer, the term of this patent is extended or adjusted under 35 U.S.C. 154(b) by 161 days.

(21) Appl. No.: 15/131,953

(22) Filed: Apr. 18, 2016

(65) Prior Publication Data

US 2016/0230802 A1 Aug. 11, 2016

Related U.S. Application Data

(62) Division of application No. 14/212,855, filed on Mar. 14, 2014, now Pat. No. 9,316,246.

(60) Provisional application No. 61/800,438, filed on Mar. 15, 2013.

(51) Int. Cl.
| | | |
|---|---|---|
| F16B 39/02 | (2006.01) | |
| F16B 37/16 | (2006.01) | |
| F16B 39/08 | (2006.01) | |
| F16B 35/06 | (2006.01) | |
| F16B 33/00 | (2006.01) | |
| F16B 2/18 | (2006.01) | |
| F16N 31/00 | (2006.01) | |

(52) U.S. Cl.
CPC ............ *F16B 39/08* (2013.01); *F16B 2/18* (2013.01); *F16B 33/004* (2013.01); *F16B 35/06* (2013.01); *F16B 37/16* (2013.01); *F16N 31/00* (2013.01); *F16N 2031/008* (2013.01)

(58) Field of Classification Search
CPC . F16B 37/16; G04B 3/04; Y10T 16/44; Y10T 4/20756; Y10T 4/20732; Y10T 4/20864

USPC .......................................... 411/432, 435, 409
See application file for complete search history.

(56) References Cited

U.S. PATENT DOCUMENTS

| | | | |
|---|---|---|---|
| 1,047,691 A | | 12/1912 | Olsen et al. |
| 2,798,404 A | * | 7/1957 | Schaefer ................. F16B 37/16 16/110.1 |
| 2,994,232 A | * | 8/1961 | Koeber ................... G03B 19/18 192/95 |
| 3,473,432 A | | 10/1969 | Joy |
| 4,294,134 A | * | 10/1981 | Mori ....................... G05G 1/085 296/223 |
| 4,419,029 A | * | 12/1983 | Wenzel .................... F16B 37/16 403/11 |
| 4,582,400 A | | 4/1986 | Lough |
| 4,845,871 A | | 7/1989 | Swan |
| 5,276,988 A | | 1/1994 | Swan |
| 5,476,020 A | | 12/1995 | Garvey |
| 5,494,368 A | * | 2/1996 | Matthews ............. B24B 45/006 403/256 |
| 5,585,578 A | | 12/1996 | Shimotori |
| 5,590,991 A | | 1/1997 | Garuglieri |
| 5,680,725 A | | 10/1997 | Bell |
| 6,295,754 B1 | | 10/2001 | Otteman |

(Continued)

*Primary Examiner* — Flemming Saether
(74) *Attorney, Agent, or Firm* — Fitch, Even, Tabin & Flannery LLP

(57) ABSTRACT

Fasteners are disclosed herein which resist loosening even when used in applications and environments where the fastener is exposed to vibration. In one form, a two piece fastener is used for connecting multiple workpieces. In another form, a simplified fastener is disclosed for quickly and easily connecting items. In yet another form, a plug type fastener is disclosed. Other fasteners and related methods are also disclosed herein.

10 Claims, 25 Drawing Sheets

(56) References Cited

U.S. PATENT DOCUMENTS

| | | | |
|---|---|---|---|
| 6,606,813 B1 | 8/2003 | Squire | |
| 7,204,052 B2 | 4/2007 | Swan | |
| 7,272,904 B2 | 9/2007 | Larue | |
| 7,444,776 B2 | 11/2008 | Adams | |
| 7,481,016 B2 | 1/2009 | Gonzalez | |
| 7,694,450 B2 | 4/2010 | Keng | |
| 7,730,655 B2 | 6/2010 | Spuhr | |
| 8,028,456 B2 | 10/2011 | Peterson | |
| 8,186,921 B2 | 5/2012 | Lowman | |
| 8,534,375 B2 * | 9/2013 | Matsumoto | B25F 5/02 16/110.1 |
| 9,021,660 B2 * | 5/2015 | Ramsauer | E05B 1/0015 16/412 |
| 9,316,246 B2 | 4/2016 | Emmerich | |
| 9,850,928 B2 * | 12/2017 | Bowers | F16B 5/0642 |
| 2004/0000083 A1 | 1/2004 | Grant | |
| 2005/0241212 A1 | 11/2005 | Swan | |
| 2005/0252060 A1 | 11/2005 | Gonzalez | |
| 2006/0123686 A1 | 6/2006 | Larue | |
| 2006/0179703 A1 | 8/2006 | Leatherwood | |
| 2006/0207156 A1 | 9/2006 | Larue | |
| 2007/0033852 A1 | 2/2007 | Adams | |
| 2008/0000134 A1 | 1/2008 | Peterson | |
| 2008/0034638 A1 | 2/2008 | Spuhr | |

\* cited by examiner

SECTION G-G
SCALE 4 : 1

SECTION M-M
SCALE 4 : 1

SECTION G-G

SECTION M-M
SCALE 4 : 1

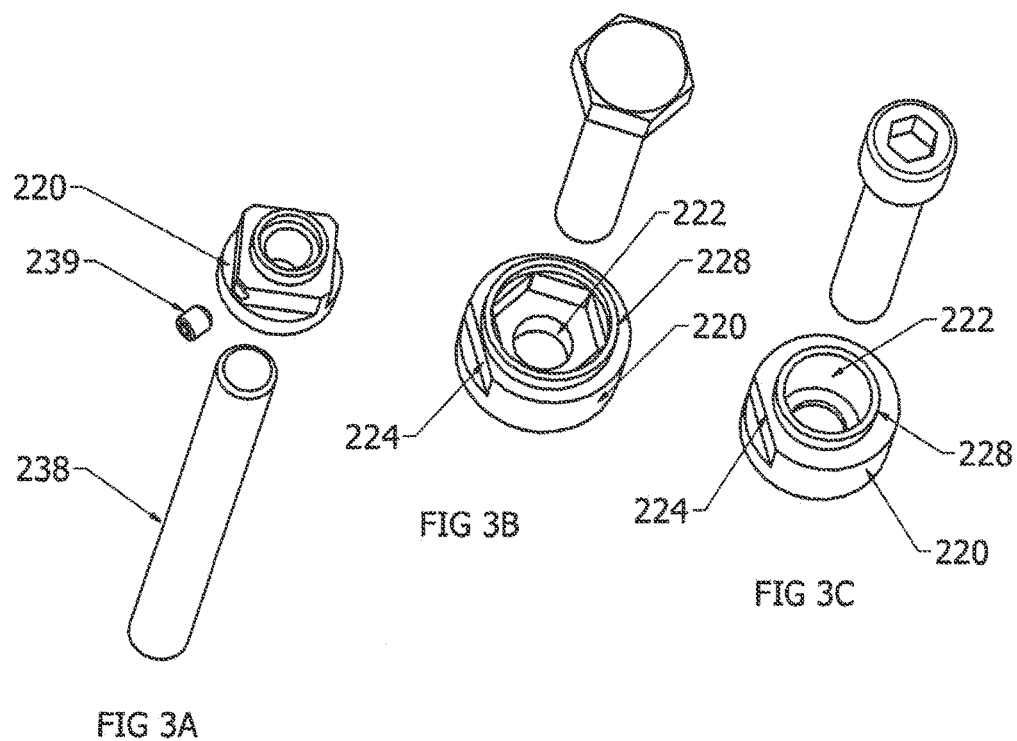

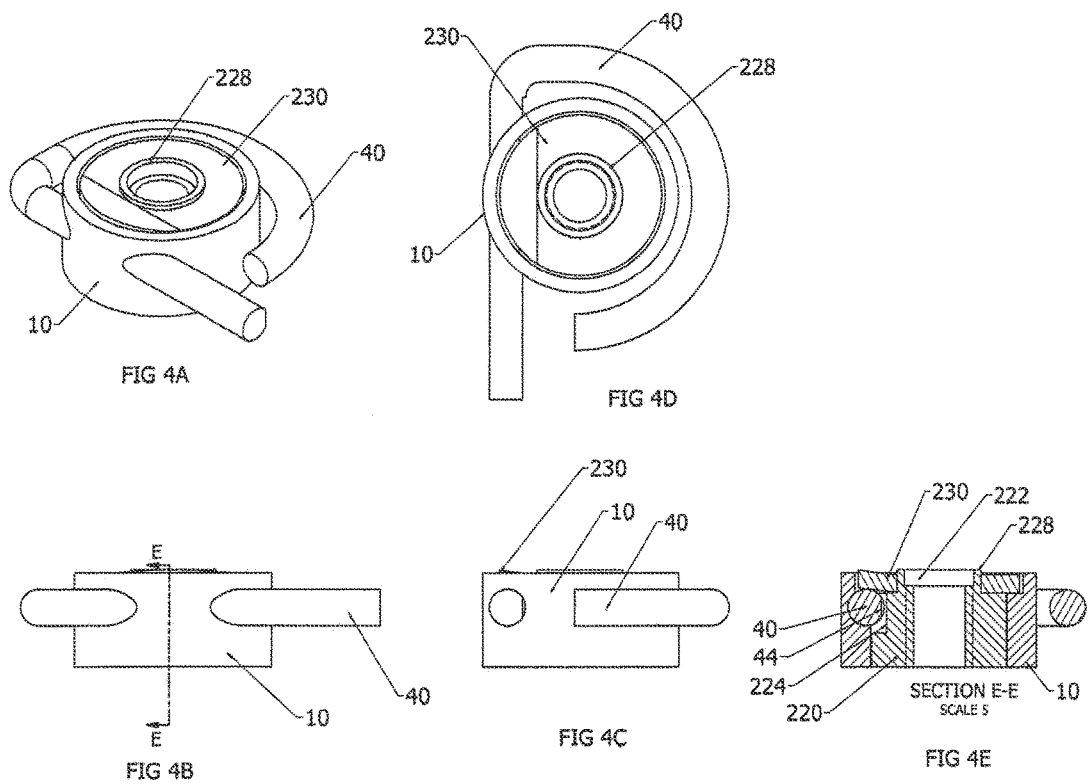

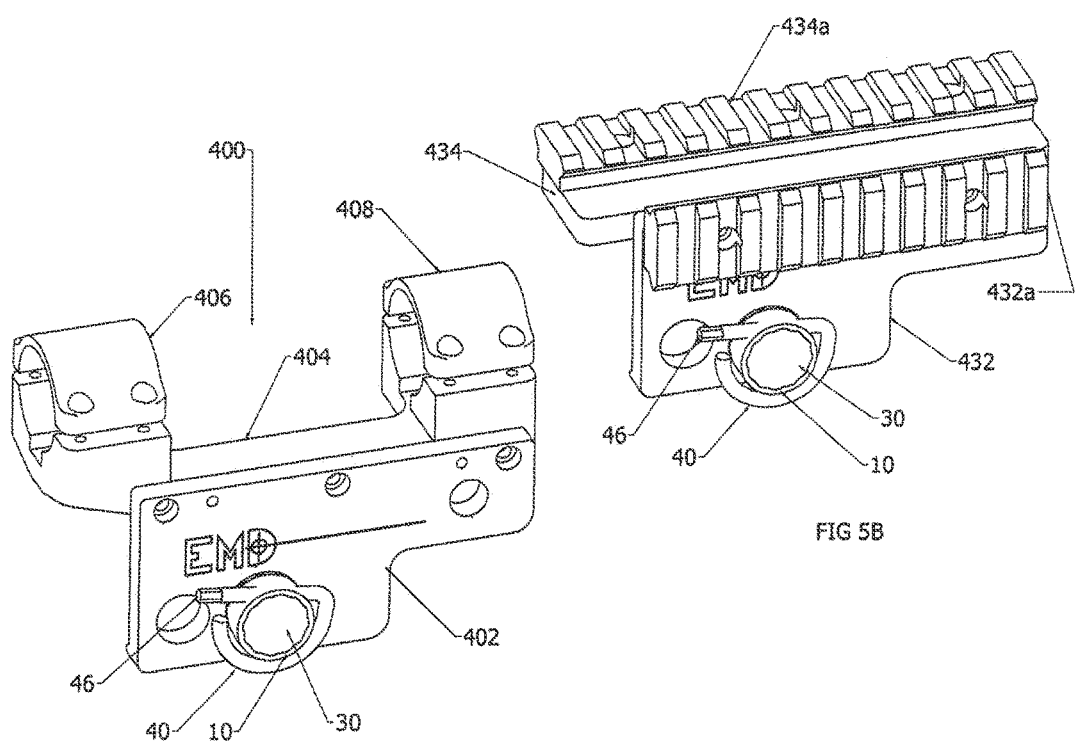

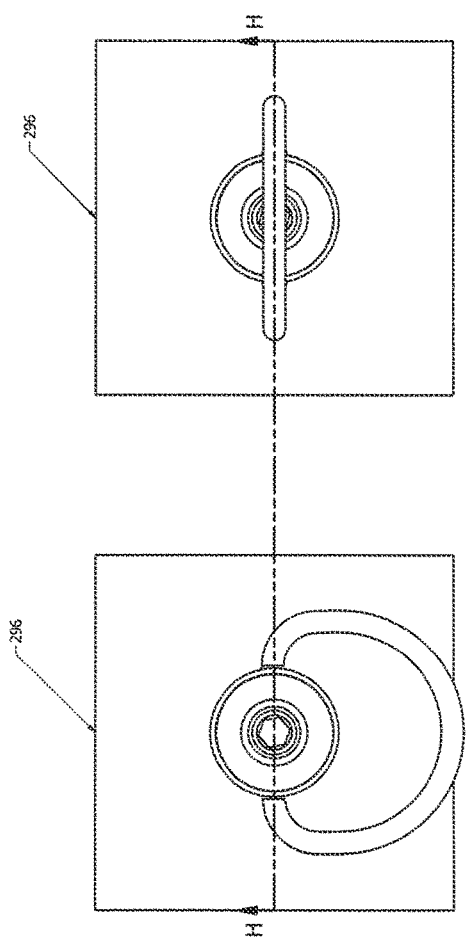
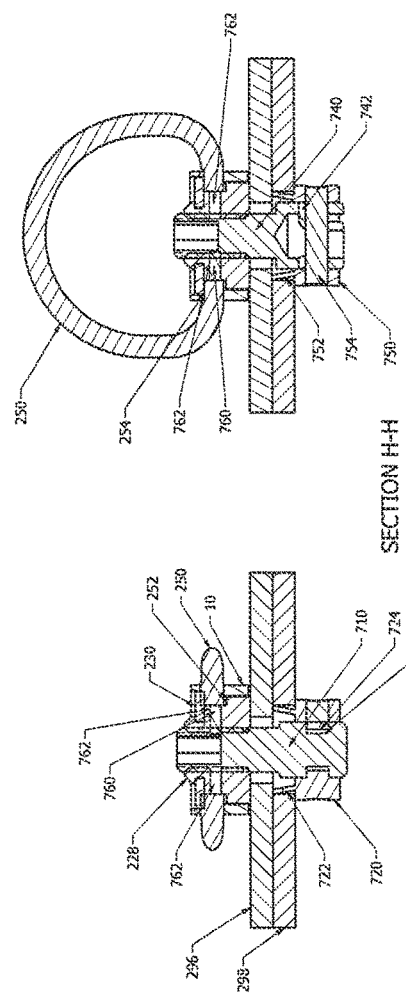

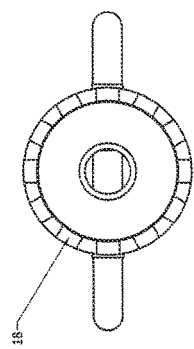
FIG 10D
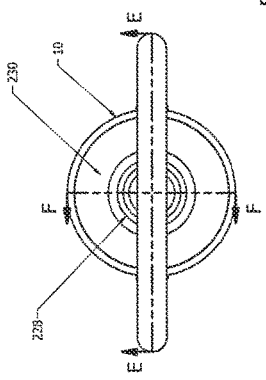
FIG 10B
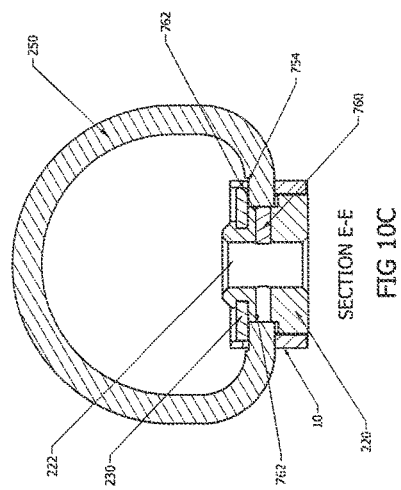
FIG 10C
FIG 10E
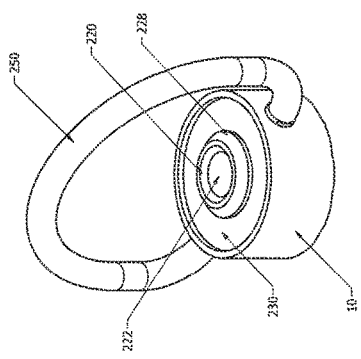
FIG 10A

SECTION G-G

FIG 14 J-M SHOWN WITHOUT SPRING WASHER (830)

SECTION J-J

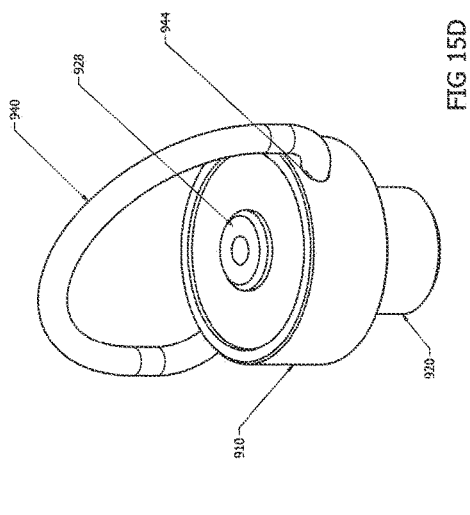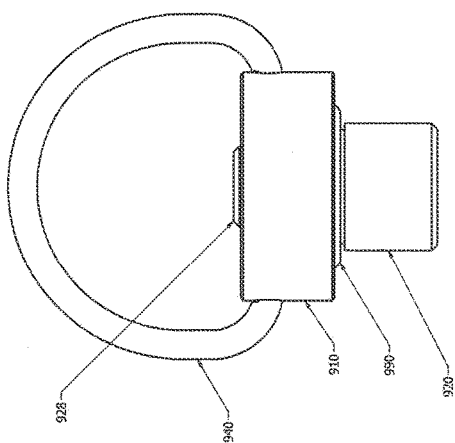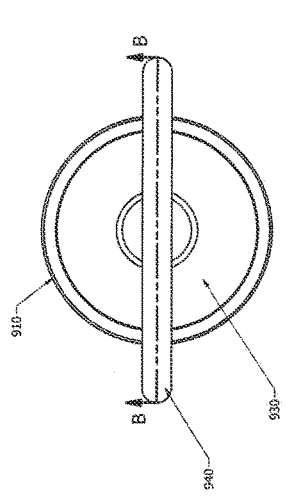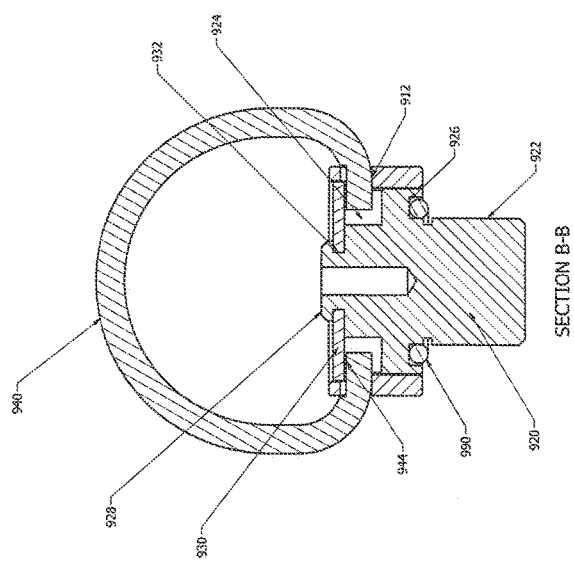

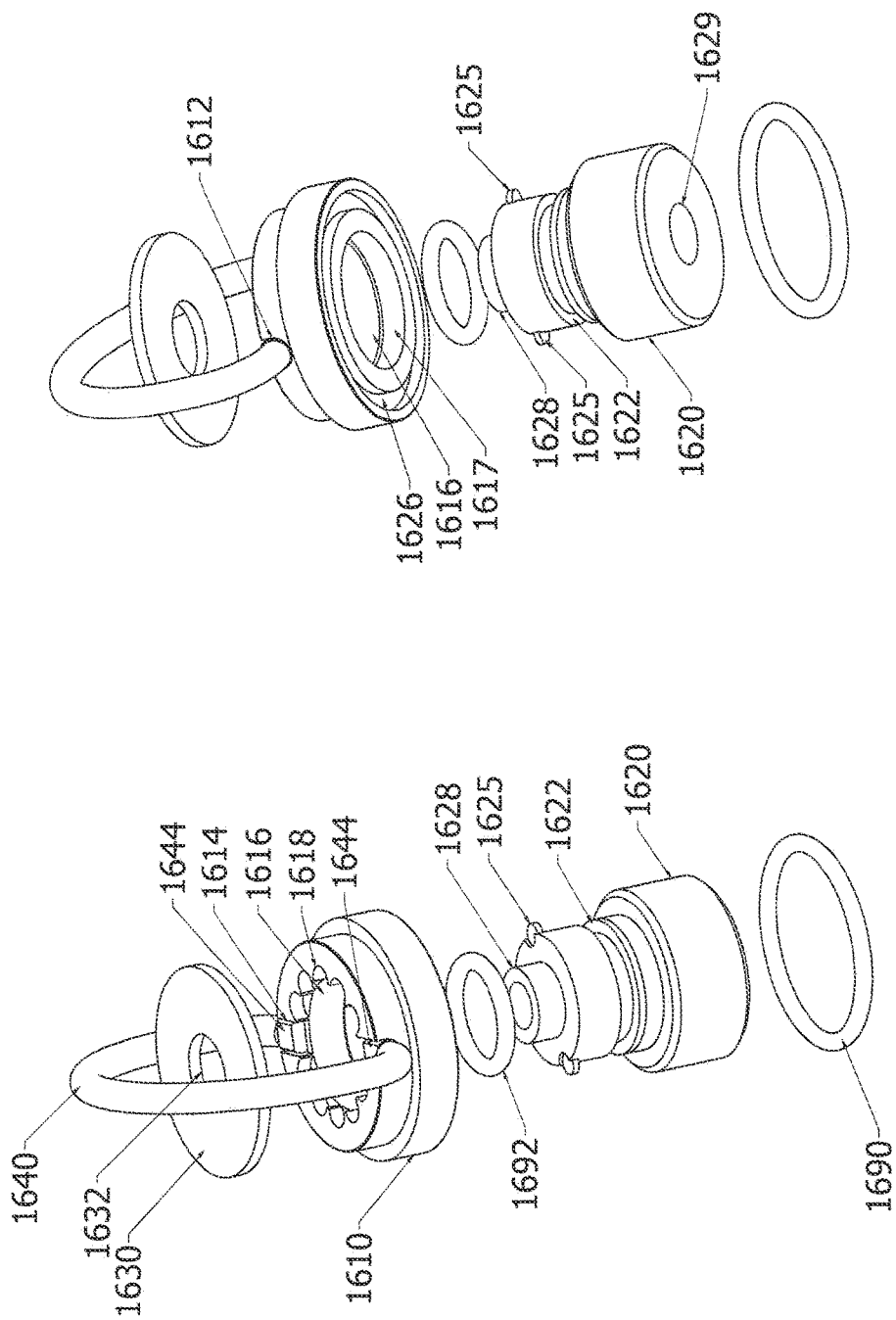

SECTION I - I

DETAIL G

SECTION F - F

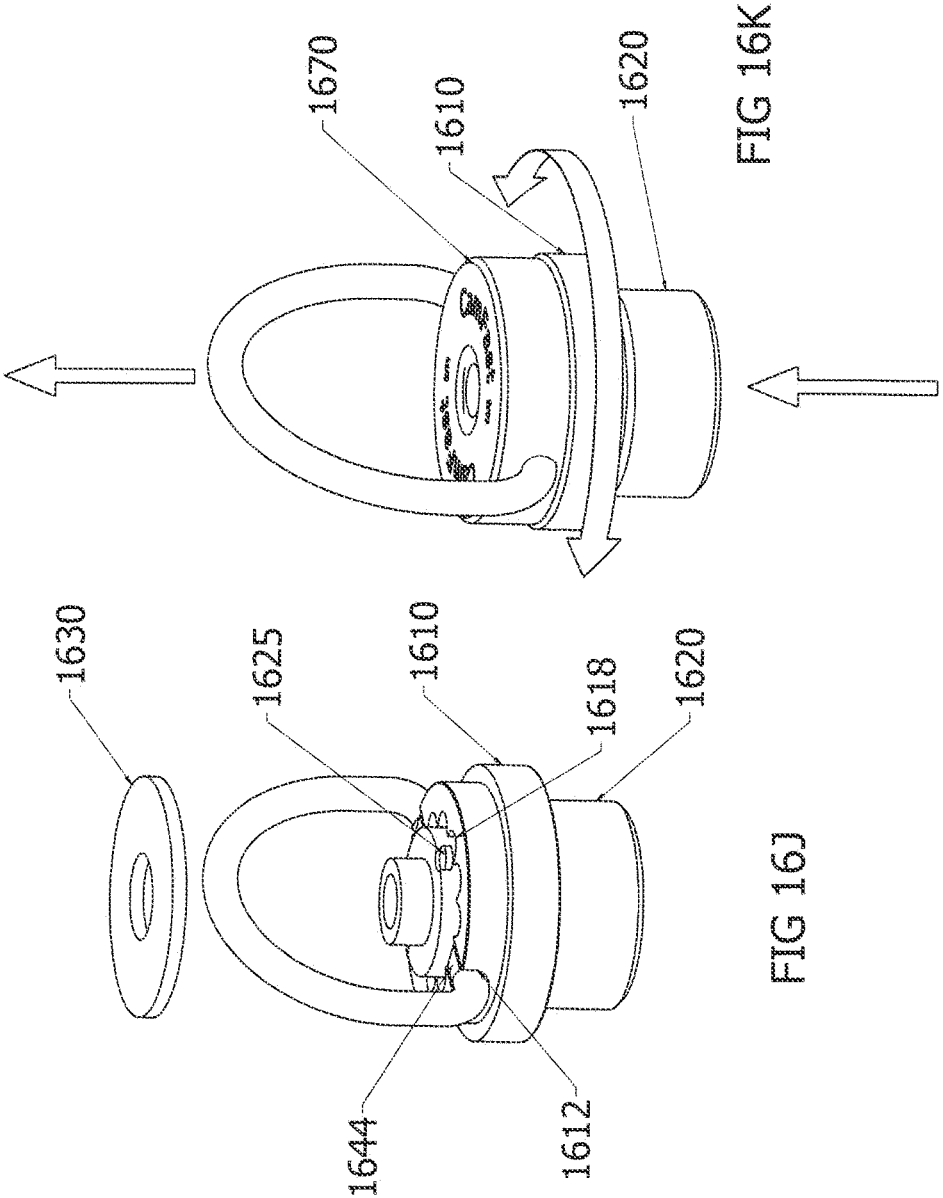

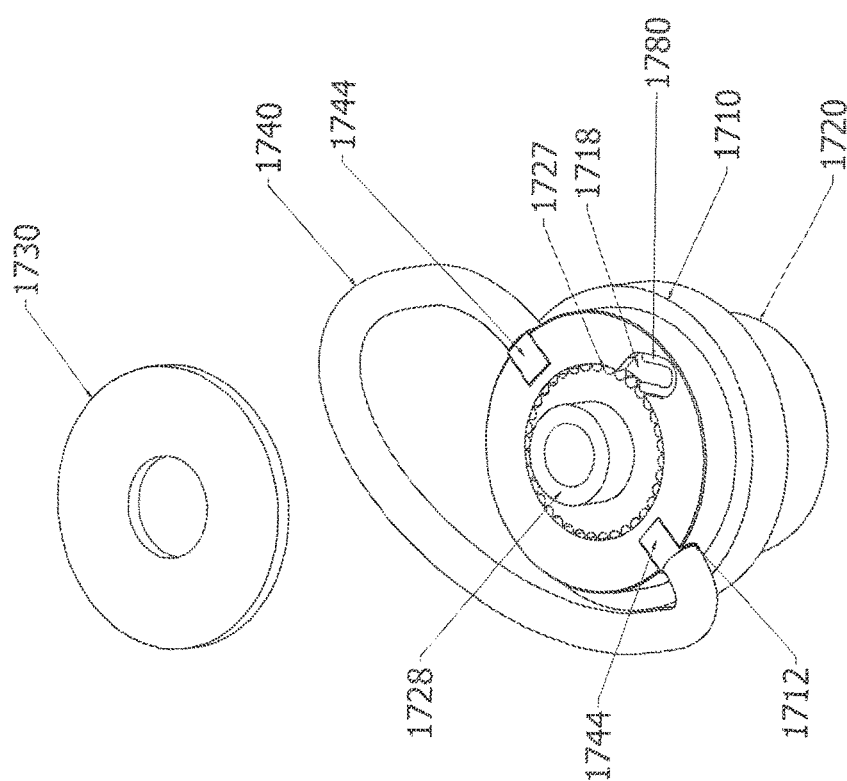

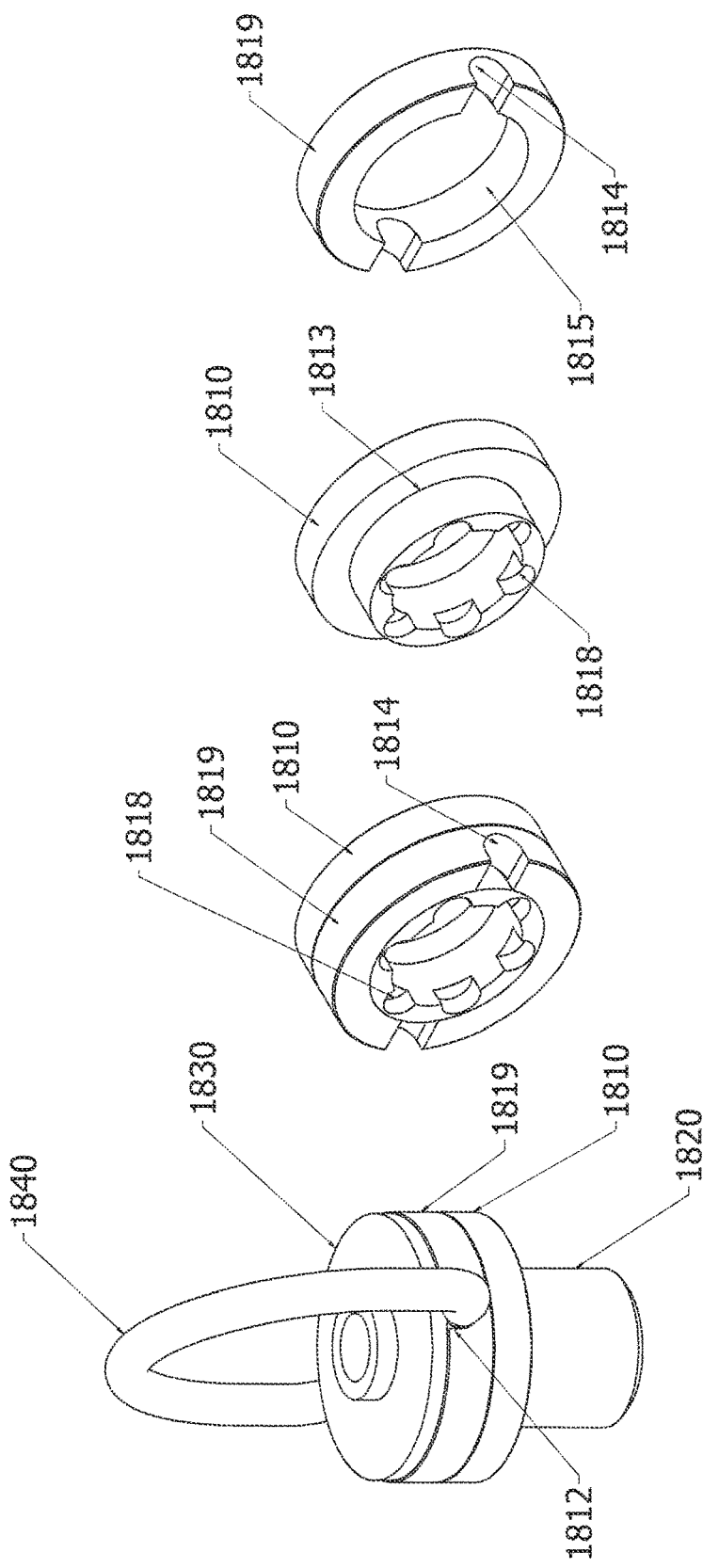

FASTENERS AND METHODS RELATING TO SAME

CROSS REFERENCE TO RELATED APPLICATIONS

This application is a divisional of U.S. application Ser. No. 14/212,855, filed Mar. 14, 2014, which claims the benefit of U.S. Provisional Application No. 61/800,438, filed Mar. 15, 2013, both of which are hereby incorporated herein by reference in their entirety.

FIELD OF THE INVENTION

The present invention relates to self locking fasteners and methods relating to same.

BACKGROUND OF THE INVENTION

Fasteners are used in a variety of applications. For example, some fasteners, such as thumb screws, are used to lock items down, or in place, or to secure items, and allow the fasteners to be easily removed without the need for hand tools to tighten or loosen the fastener. One problem with such fasteners, however, is that they are often prone to loosening do to external forces applied against them, such as vibration and other forms of interference. For example, thumb screws are used to secure scope mounts to some fire arms. Often times these thumb screws loosen due to the vibration the screws experience during operation of the fire arm. Eventually the screws may loosen or give way enough to cause the scope to move out of alignment and affect the accuracy of the scope and/or the fire arm operator's accuracy. Other problems associate with such fasteners relate to the methods associated with manufacturing and/or assembling these items and the methods for fastening associated with such items.

Prior attempts have been made to secure components to firearms using screws in combination with cam levers, detents and locking pins but all of these still have disadvantages. Original designs used simple thumb screws that easily loosened and required frequent hand tightening in order to remain secure in use. In later designs, as in U.S. Pat. No. 7,694,450, an eccentric cam is used to align or adjust the fit of the optical mount to the side of a M14 rifle receiver but a mechanical fastener ultimately holds the mount to the M14s receiver. Thus, with this design tools are still required to tighten the mechanical fastener, such as wrenches or other means of adding torque, and the fastener itself remains susceptible to loosening due to the vibration that the fastener is exposed to during the operation of the firearm. In other designs, as in U.S. Pat. No. 7,272,904, a throw lever connected to a tapered eccentric cam is used that engages the underside of a Weaver or Picatinny rail. This design is limited to only rail mounting systems and requires tools to adjust the ultimate holding force of the cam. Furthermore, it appears to also be susceptible to vibration and loosening as evident by the fact the same applicant has had to add a locking pin to the lever to prevent the lever from coming loose as disclosed in U.S. Pat. No. 7,272,904.

In other applications, fasteners are used to connect two or more work piece members together in such a way that they can be readily secured or tightened and, just as readily, released. For example, U.S. Pat. No. 4,133,142, issued Jan. 9, 1979 to Dzus, illustrates a latch for releasably holding two members together. The latch includes a stud adapted to be mounted in fixed position on one of the members and a receptacle adapted to be mounted in fixed position on the other of the members and located to engage with the stud when the members are brought together. A simple turn of the member with the stud can rotate the stud into engagement with the receptacle to secure or tighten the latch to secure the two work piece members together. An opposite turn of the member with the stud can rotate the stud out of engagement with the receptacle so that the member with the stud and the receptacle (and their respective work piece members) are freely moveable with respect to one another. Unfortunately, such fasteners are typically limited in the amount of turning they can require to secure or release the fastener, require tools to operate the fastener components and/or are susceptible to vibration and loosening in certain applications.

In still other applications, fasteners are used to obstruct or plug openings. For example, fasteners such as plugs are often used to releasably block bilge well openings on boats and fluid drains, such as oil drains on vehicles and machinery. Such fasteners typically require tools to operate and/or are susceptible to vibration and loosening in certain applications. Like all the above-mentioned embodiments, such fasteners also do not offer ways in which the fastener can be adjusted or altered without tools in order to accommodate particular users (e.g., left handers, right handers, those with injuries or limitations, etc.) and/or accommodate the particular application the fastener is used in (e.g., particulars with respect to the surrounding environment, such as if it is a tight working space or if obstructions are present, etc.). Conventional fasteners also do not make it easy to determine when a fastener has been secured to a work piece a sufficient amount and fail to allow a user to use different materials for different components of the fastener.

Accordingly, it has been determined that a need exists for an improved fastener and methods relating to same which overcome the aforementioned limitations and which further provide capabilities, features and functions, not available in current fasteners and methods relating to same.

SUMMARY OF THE INVENTION

A self-locking and/or quick release fastener is disclosed herein which is self-contained and resists loosening even when used in applications and environments where the fastener is exposed to vibration. In one form the present invention provides a screw-type or bolt type fastener, methods of manufacturing and/or assembling such fasteners, and methods of fastening using such fasteners. In another form, the invention provides a nut-type fastener, methods of manufacturing and/or assembling such fasteners, and methods of fastening using such fasteners. In still other forms, the invention provides components for creating self-locking and/or quick release type fasteners using at least in part conventional materials and/or fasteners, methods of manufacturing and/or assembling such fasteners, and methods of fastening using such fasteners. In another form, the invention provides prepackaged kits for customizable fasteners that purchasers can buy and use to assemble customized fasteners in accordance with the invention. In yet other embodiments, the invention provides quick release fasteners or latches, such as fractional-turn fasteners (e.g., quarter-turn fasteners), for use in applications where it is desired to releasably hold or secure two or more work pieces or work piece members. In another form, the invention provides quick-release fasteners for obstructing or plugging openings such as boat well openings, fluid drains such as oil drains and engine sump drains on vehicles and machinery. The embodiments disclosed herein provide quick-release and/or self-locking fasteners that can secure a work piece member without require the use of tools (e.g., tool less fasteners), that have a reduced susceptibility to vibration and loosening. More over the exemplary embodiments of the invention disclosed herein include the ability to reposition or reorient fasteners (e.g., reorientable or reorientatable fasteners) in order to offer ways in which the fastener can be adjusted or altered without tools in order to accommodate particular users (e.g., left handers, right handers, those with injuries or limitations, etc.) and/or accommodate the particular application the fastener is used in (e.g., particulars with respect to the surrounding environment, such as if it is a tight working space or if obstructions are present, etc.). In other forms, ratcheting and/or audible fasteners are provided that make it easy to determine when the fastener has been secured to a work piece a sufficient amount. The ratcheting fastener can provide audible feedback and/or tactile feedback to a user to help the user understand when the fastener has been sufficiently coupled or uncoupled to a work piece. In some forms, the ratcheting fasteners are configured to allow rotation in only one direction to further simplify operation of the fastener. In still other forms, alternate multi-piece fasteners and/or poly-material fasteners are provided that allow a fastener to have components of a first type of material and components of a second type of material different from the first, and so on, to accommodate particular applications and/or uses for the fastener. For example, in one form a bi-material fastener, such as a bi-metal fastener, is provided having a stainless steel threaded shank and an anodized aluminum outer sleeve and/or cover for use in motorcycle oil plug applications or other applications where a visible plug type fastener is required and attractive appearance is desired.

Many methods are also disclosed and contemplated herein including but not limited to methods of manufacturing, methods of fastening, methods for fastening a screw or bolt, methods for fastening a nut or collar, methods for manufacturing fasteners including a method for manufacturing a screw or bolt and a method for manufacturing a nut, and methods of doing business such as methods of packaging fasteners for sale, methods of providing pre-packaged fasteners with pre-determined specifications and methods of selling customizable parts for the construction or assembly of customized fasteners for purchase. Methods of manufacturing or providing two-piece, fractional turn, quick-release, plug, reorientable, ratcheting and/or audible or tactile feedback type and poly-material fasteners are also provided herein, as are methods of securing or using such fasteners. Methods of marking fasteners with various designs, marks, indicia and the like are also disclosed as are methods of identifying fasteners using color, indicia, marks and similar markings.

These and other embodiments and methods of the invention will become apparent to one of ordinary skill in the art upon reading the detailed description of the invention that follows below.

BRIEF DESCRIPTION OF THE DRAWINGS

The invention will be explained in exemplary embodiments with reference to drawings, in which:

FIGS. 3A-C are perspective views of alternate fastener components in accordance with other forms of the present invention;

FIGS. 4A-D are perspective, rear elevation, side elevation and plan views of the fastener of FIG. 2, respectively, illustrating the possible deflection that the washer can incur if the fastener is setup with such a configuration; and FIG. 4E is a cross-sectional view of the fastener of FIG. 2 taken along line E-E in FIG. 4B, further illustrating the possible deflection that the washer can incur if the fastener is setup with such a configuration;

FIGS. 5A-B are perspective views of alternate scope mounts in accordance with the present invention, with FIG. 5A illustrating a Weaver type mount and FIG. 5B illustrating a Pickatinny type mount;

FIGS. 7A-C are exploded, top and cross-sectional views of a fractional turn fastener with a partial pin receiver in accordance with another aspect of the present invention, the cross-sectional view being taken along line H-H in FIG. 7B;

FIGS. 8A-C are exploded, top and cross-sectional views of a fractional turn fastener with a full pin receiver in accordance with another aspect of the present invention, the cross-sectional view being taken along line H-H in FIG. 7B;

FIGS. 10A-E are perspective, top, front cross-sectional, bottom and side cross-section views of an alternate fastener with an integrated frictional element in accordance with another aspect of the present invention, the front cross-sectional view being taken along line E-E in FIG. 10C and the side cross-sectional view being taken along line F-F in FIG. 10D;

FIGS. 15A-E are exploded, top, cross-sectional, perspective and front elevation views of an alternate plug type fastener in accordance with another embodiment of the invention, the cross-sectional view being taken along line B-B in FIG. 15B.

FIGS. 16A-B are exploded views of an alternate plug type repositionable or reorientable fastener in accordance with another embodiment of the invention, with FIG. 16A being viewed from above and FIG. 16B being viewed from below and both drawings illustrating the corresponding mating structures of the outer body or cup/sleeve and the insert which are movable between a first or engaged position wherein the outer body and insert move in unison with one another and a second or disengaged position wherein the outer body and insert move independently from one another;

FIGS. 16J-K are partially exploded and perspective views, respectively, of the plug of FIGS. 16A-I, with FIG. 16J illustrating the fastener in the second or disengaged position of FIGS. 16H-I with the biasing or spring member exploded from the fastener to show how the corresponding mating structures of the outer body and insert disengage from one another to allow the outer body and actuator handle or pin to move independent of the insert and FIG. 16K illustrating the fastener with an optional cap or cover member on the fastener to allow for the displaying of indicia, color or the like and having a vertical arrow to indicate movement of the plug portion of the fastener to put the fastener in the second or disengaged position and a horizontal arrow illustrating possible movements the outer body may make with respect to the insert when in the second or disengaged position so that the outer body and actuator handle may be repositioned or reoriented with respect to the insert;

FIG. 17 is a perspective view of an alternate ratcheting or audible type fastener in accordance with additional aspects of the invention disclosed herein;

FIG. 18A illustrates a perspective view of an alternate fastener embodiment in accordance with the invention in which a poly-material repositionable or reorientable plug type fastener is illustrated; and FIGS. 18B-D are perspective views of alternate outer body or cup/sleeve structures that may be used in conjunction with the fastener of FIG. 18A, with the outer body structures being made of a first material different from the insert (not shown).

Figure 1A:
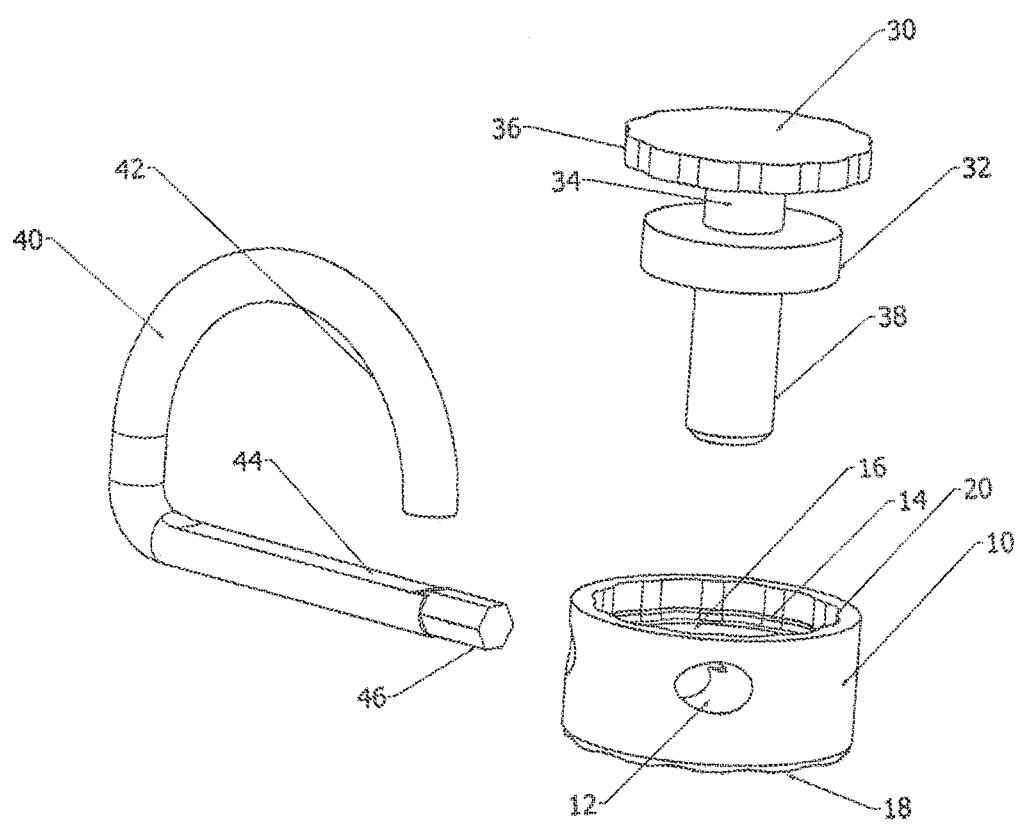
FIG. 1A is an exploded view of a screw type fastener in accordance with one form of the present invention.
Figure 1B:
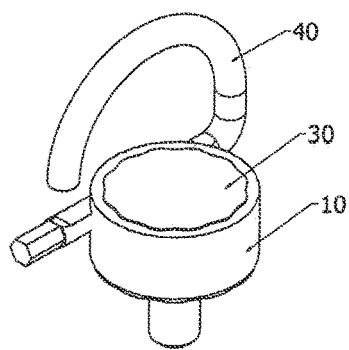
FIGS. 1B-F are perspective, plan, front elevation, bottom and side elevation views of the fastener of FIG. 1, respectively, with the cam handle in the unlocked position.
Figure 1C:
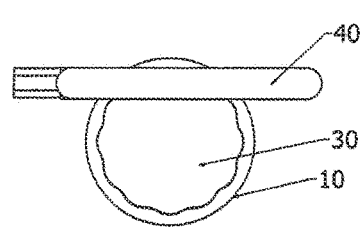

While the invention will be described in connection with preferred embodiments, it will be understood that it is not intended to limit the invention to these embodiments. On the contrary, it is intended to cover all alternatives, modifications and equivalents as may be included within the spirit and scope of the invention as defined by the appended claims. Furthermore, skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENT

Self locking fasteners in accordance with the invention are disclosed herein and will be discussed in further detail below. In addition methods associated with said fastener are also disclosed including, but not limited to, methods of fastening, methods of manufacturing and assembling a fastener, methods of customizing a fastener and methods of packaging and selling a fastener.

In one form, the self locking fastener comprises a screw or bolt with a cup and a cam locking mechanism, such as a pin as illustrated in FIGS. 1A-M. In this embodiment the screw or bolt is designed with a shoulder portion, such as ring (32) located above the threaded shaft or shank (38) of the screw or bolt, with an upper head (30) that is located above the ring (32) and spaced apart therefrom to define an opening, such as groove (34), that a portion of locking pin (40) will occupy when the screw is inserted in the cup (10) and the locking pin (40) is inserted through the opening (12) of cup (10) as will be described further below. The upper head (30) preferably being of a certain thickness and diameter to be strong enough but enable a certain amount of deflection so as to develop a suitable amount of force between the head of the screw (30), the locking pin (40) and the cup (10), when assembled. In alternate embodiments, the ring (32) and/or shaft (44) of locking pin (40) may alternatively be designed to provide deflection instead of, or in addition to, the upper head (30) of the screw.

The cup (10) is formed as a round cylinder with a stepped interior that is designed to fit around the screw ring (32) and around the screw head (30), which in this embodiment has a larger diameter than the diameter of the ring (32). A whole (12) perpendicular to the primary axis of the cylinder, on a chord across the cylinder, serves to orient the locking pin (40) in the groove (34) between the ring (32) and the head of the screw (30). In alternate forms, the cup (10) may be shaped as a simple sleeve, rather than a cup, with an opening to position the locking pin (40) in the groove (34).

In the embodiment illustrated in FIG. 1A, the locking pin (40) comprises a round wire bent into a D shape to form a clip, and having a flattened portion (44) along the straight section of the "D" shaped clip which creates a D shaped cross section at least along the portion that is inserted into the cup (10). As may be better understood from looking at FIGS. 1G and 1M, the orientation of this D shape cross section allows the cup (10) to be closer to the screw head (30) with the D in the "up" position or with the flattened portion (44) of pin (40) facing up (see FIG. 1G cross section). When the D rotates toward the "down" position or when the flattened portion (44) is moved to a position other than facing up (see FIG. 1M cross section), the cup (10) is held further away from the screw head (30) thereby causing the screw head (30) to deflect and exert downward pressure via the locking pin (40) on the cup (10).

In the form illustrated, the locking pin (40) includes an integrated tool that may be of other use for the particular application the fastener will be used in. For example, in FIGS. 1A-M, the pin (40) includes a hex key or head (46) for use tightening down and/or loosening bolts or screws with hexagonal head sockets like those used on rifles and/or in connection with rifle scopes and scope mounts. Thus, the fastener depicted serves as a multi-function tool in that it can be used both as a tool and a self locking fastener all in one. In alternate forms, other types of tools may be provided including but not limited to screwdrivers, punches, etc., or alternatively no additional tool end (46) may be provided. It should also be appreciated that the locking pin (40) may be designed with a variety of different shapes. For example, instead of leaving a larger gap between the distal end of the handle and the flattened portion (44) or tool end (46), the pin (40) could be provided with minimal gap so that it serves as more of an R pin or hairpin cotter pin that secures the pin (40) to the cup (10) when inserted through the cup (10). In yet other forms, the locking pin (40) could be designed as a simple shaft with a cammed surface instead of a handled pin as shown. Such a shaft could be designed with a ridge or bump to lock the pin into the cup (10) if desired. In still other embodiments other conventional types of pin and shaft designs may be used.

Now turning back to the embodiment illustrated in FIGS. 1A-M, with the screw head (30) inside the cup (10), at least a portion of the locking pin (40) can be passed through the alignment hole (12) in the cup (10), effectively holding all three pieces of the assembly together. With the D shaped cross section portion of the locking pin (40) in the "up" position or the flattened portion (44) facing up (see FIG. 1G cross section) the screw can be threaded into a mating hole (e.g., an internally threaded bore, an internally threaded nut, etc.). When the screw is hand tight, the D clip can be rotated to the "down" position where the flattened portion (44) is not facing up (see FIG. 1M cross section), effectively increasing the distance between the bottom of the cup (10) and the top of the head (30) of the screw. This increase in thickness (relating to the cam action of the pin (40)) is sized to create a substantial amount of force on the cup, effectively torquing the screw against the surface containing the mating hole that the screw has been threaded into or the surface that is positioned between the screw head (30) and the nut the fastener is being threaded into (if used in such a configuration).

In a preferred form, the screw head (30) and cup (10) are designed with a mating configuration that prevents the screw from rotating with respect to the cup (10) once positioned within cup (10). For example, in the embodiment illustrated in FIGS. 1A-M, the screw head (30) and cup (10) are designed with matching rosette patterns (36, 20) that allow the screw head (30) to be positioned within the cup (10) in a variety of different rotational directions, but then prevent rotational movement of the screw head (30) (and thus the screw) once inserted into the cup (10) due to the matching rosette pattern of the inner wall of the cup (10). The screw head (30) rests on the step (14) formed inside the cylinder of cup (10). In the form illustrated the rosette pattern provides twelve different orientations that the screw can be placed in with respect to the cup (10). In alternate embodiments, different mating configurations may be used providing as many different orientations (or plurality of orientations) as may be desired. For example, symmetrical mating configurations such as triangular, rectangular, hexagonal, Torx, starred or toothed, etc. shaped designs may be used to allow the screw head (30) to fit within the cup (10) while still preventing rotation. In yet other examples, asymmetric designs may be used to ensure that the screw head (30) (and thus screw) can only be fit within the cup (10) in one orientation. In still other embodiments, no mating structure may be used, for example, if rotation of the screw is desired within the cup (10). In the latter embodiment, the cup (10) may be designed with a threaded opening, if desired, and a set screw may be disposed in the threaded opening and used to fix the screw into a desired position with respect to the cup (10).

The cup (10) may also be formed with a design or surface to aid in preventing the cup (10) from rotating with respect to the surface of anything it comes into contact with. For example, in the embodiment illustrated in FIGS. 1A-M, the lower surface or bottom of the cup (10) is designed with a scalloped pattern (18) to create a frictional engagement between the bottom of the cup (and thus the cup itself) and whatever surface the bottom of the cup comes into contact with (e.g., the abutted surface). In yet other forms, a variety of different designs, surfaces (or surface textures), or coatings may be used on the bottom of the cup (10) to accomplish the above described frictional engagement between the cup and the surface it comes into contact with. For example, in one form a textured surface may be used on the bottom of cup (10) to create a frictional engagement between the cup (10) and the surface it comes into contact with when the fastener is attached to something. In another form a sticky coating may be applied to the bottom of the cup (10) to create such a frictional engagement. For example an adhesive, such as glue or double sided tape, may be applied to the bottom of the cup (10) to create the frictional engagement. In the case of double sided tape, for example, the tape may already be applied to the bottom surface of cup (10) on one side and a peelable film or membrane may be left over the opposite, exposed side of the tape so that a user can remove this film and membrane when they wish to have the cup (10) form a frictional engagement with whatever surface it comes into contact with. In still other forms, the bottom of the cup (10) may be designed with protrusions, such as angled barbs, that dig into the surface of whatever the fastener is being connected to in order to prevent rotation, or protrusions that engage a like pattern in the mating surface. In some application, however a cup (10) with a smooth bottom surface may be desired and therefore used. In yet other forms, all of these alternate designs, surfaces or coatings may be implemented on the ring (32) either in addition to or in lieu of the cup (10), if desired. It should also be appreciated that all of the alternate embodiments mentioned above may be used or implemented in the alternate fastener forms that will be discussed further below.

Thus, in the embodiment of FIGS. 1A-M, a self locking fastener is disclosed that is self-contained and resists loosening even when used in applications and environments where the fastener is exposed to vibration or shock. Unlike conventional fasteners, the cam actuator (40) is contained within the cup (10) and does not need to come into direct contact with the article that is being fastened. When actuated the cam actuator (40) applies force on the cup (10) to engage an external surface of one of the articles being fastened thereby causing the articles to be secured or clamped together so that one cannot move with respect to the other. In the form illustrated the screw head (30) serves as a spring that allows the fastener to apply the force on cup (10) which ultimately causes the clamping of the articles being fastened together.

Turning now to FIGS. 2A-M, in another form, the invention may comprise a fastener such as a nut with a cup, sleeve, washer and a cam locking mechanism. In this embodiment, the fastener is designed with a cup (10) and pin (40) similar to those discussed above with respect to FIGS. 1A-M, however, the fastener also includes a sleeve (220) and a washer (230). The sleeve (220) has a shoulder portion (226) with an inner collar (228) extending upward therefrom and a flattened side wall and step (224) on one side which engages the pin (40) when inserted through the holes (12) of cup (10). The inner collar (228) is coaxially aligned with the remainder of the sleeve (220) and has an inner opening that is larger in diameter than at least a portion of the remaining opening (222) defined by the sleeve (220) in order to form an inner shoulder or step within the diameter of the inner collar (228). In a preferred form the inner collar comprises a tubular rivet which the washer (230) can be positioned about via opening (232) and then the collar can be deformed (e.g., upset or bucked) to secure the washer (230) to the sleeve (220). Once connected in this manner the washer (230) and flattened side wall and step (224) form an opening, like opening (34) mentioned above, that can be aligned with the openings (12) of cup (10) to form a channel so that locking pin (40) can be inserted into the assembly through the channel formed by these parts.

With the washer (230) and sleeve (220) connected and inserted inside the cup (10), at least a portion of the locking pin (40) can be passed through the alignment holes (12) in the cup (10), effectively holding all four pieces of the assembly together. In the form illustrated, the remaining opening (222) of sleeve (220) may be threaded or partially threaded in order to accept a mating fastener such as a bolt or screw. Thus, when the D shaped cross section portion (44) of the locking pin (40) is in the "up" position or with the flattened portion (44) facing up (see FIG. 2G cross-section) the nut can be threaded onto the mating screw or bolt and when the nut is hand tight, the D clip (40) can be rotated to the "down" position where the flattened portion (44) is not facing up (see FIG. 2M cross-section), effectively increasing the distance between the bottom of the cup (10) and the washer (230) thereby causing the downward pressure on the nut to secure the nut and its mating fastener in position. As in FIGS. 1A-M, this increase in thickness (relating to the cam action of the pin (40)) is sized to create a substantial amount of force on the cup (10), effectively torquing the nut against the surface adjacent the nut and through which the mating fastener has been inserted.

Although a rivet configuration is used to secure the washer (230) to the sleeve (220), it should be understood that other fastening techniques and configurations may be used to secure the washer (230) to the sleeve (220) (e.g., interference fit, welding, pin or pins inserted through the collar (222) above the washer to secure the washer to the sleeve (220), set screws or simply posts threaded above the washer to prevent its removal, detents on the collar that the washer gets pressed over and then secured on the sleeve thereby, ball and detent configurations, etc.). In fact in other embodiments, the washer (230) may be formed integrally with the sleeve (220) so long as the washer (230) continues to allow the appropriate amount of deflection required to allow the necessary movement of the pin (40) to take place (e.g., to allow the above described cam or camming action to take place). If desired, the fastener could be designed such that the sleeve with integral washer could then be interference fit into the cup (10). In still others forms, the washer may be replaced with a threaded cap that screws onto the collar (222) and provides a surface for capturing the pin (40) while still allowing for deflection (e.g., if the fastener nut is not setup with the pin to deflect or the step (224) to deflect). In yet other forms, the nut fastener may be configured such that the sleeve (220) itself forms the groove within which the pin (40) is inserted and the sleeve is interference fit (e.g., like a press fit nut) into or reverse threaded into the cup (10).

It also should be understood that although the cup (10) and sleeve (220) are illustrated as having cylindrical configurations, these parts could take various other sizes and shapes in alternate embodiments if desired. For example, both the cup (10) and sleeve (220) could be configured with square or rectangular shapes. In one form, the shape of the sleeve (220) may be configured so that it matches a mating shape of the inner opening of the cup (10) so that the sleeve (220) cannot be rotated with respect to the cup (10) (or rotated separate and apart from the cup (10)) when disposed within the cup (10), (in a manner similar to that discussed above with respect to the mating shapes of the screw head (30) and cup opening (20) of FIGS. 1A-M).

Thus, in the embodiment of FIGS. 2A-M, a self locking nut type fastener is disclosed that is self-contained and resists loosening even when used in applications and environments where the fastener is exposed to vibration or shock. Unlike conventional fasteners, the cam actuator (40) is contained within the cup (10) and does not need to come into direct contact with the article that is being fastened. When actuated the cam actuator (40) applies force on the cup (10) to engage an external surface of one of the articles being fastened thereby causing the articles to be secured or clamped together so that one cannot move with respect to the other. In the form illustrated the washer (230) serves as a spring that allows the fastener to apply the force on cup (10) which ultimately causes the clamping of the articles being fastened together.

In yet another form, the invention may comprise a collar similar to the nut configuration illustrated in FIGS. 2A-M, but which may be used with a conventional fastener such as a screw or bolt to form a self locking fastener similar to that described in FIGS. 1A-M. For example, in the form illustrated in FIGS. 3A-C, a conventional screw or bolt could be inserted into the central opening (222) of the sleeve (220) so that the assembled component would look somewhat similar to the assembly of FIG. 1 and could be screwed or threaded into a mating opening when the pin (40) is in the "up" position or with the flattened portion (44) facing up, tightened until hand tight, and then locked into position by rotating the pin (40) into the "down" position or with the flattened portion (44) in a position other than facing up. The conventional screw or bolt could be captured within or by the inner collar (228) during the deforming step of the tubular rivet so that the upsetting or bucking of the rivet (228) not only secures the washer (230) to sleeve (220), but also provides an obstruction preventing the conventional fastener from being removed from the inner opening (222) of sleeve (220).

A portion of the central opening (222) of the sleeve (220) could also be configured to have a shape that mates with the head of the conventional fastener to ensure that the conventional fastener will rotate along with the rotation of the sleeve (220) and/or cup (10) and not independently of one and/or both of these parts. For example, in one form at least a portion of the central opening (222) may form a hexagonal socket within which the hex head of a conventional fastener is inserted (e.g., disposed or nested) so that the conventional fastener cannot be rotated independent of the sleeve (220). Other mating configurations or shapes could alternatively be used as discussed above with respect to the mating shapes of the screw head (30) and cup opening (20) of FIGS. 1A-M. For example, the conventional fastener could be interference fit (e.g., press fit, friction fit, etc.) into the inner opening (222) of sleeve (220) so that it does not rotate with respect to the sleeve (220) and/or cup (10). In one such form, the head of the conventional fastener may be star shaped (or starred) and press fit into the sleeve (220) like a press fit nut. In yet other embodiments, the fastener may comprise a threaded shank (238) disposed in sleeve (220) and secured thereto via a set screw (239) as shown in FIG. 3A. The sleeve (220) may also be designed with a shape that accommodates conventional tools, such as the rectangular head configuration illustrated which can be rotated using conventional sockets, pliers or wrenches, or alternate designs such as sockets for conventional screwdrivers. Besides providing a flat surface to prevent rotation of the sleeve (220) and shank (238) from rotating with respect to the cup (10) when the cam (40) is inserted through the openings (12) of the cup (10) and the fastener is fully assembled, another advantage to the rectangular shaped sleeve head illustrated in FIG. 3A is that the sleeve (220) can be positioned in one of four different orientations with respect to the cup (10) and the cam (40). Thus, if the fastener is not capable of giving the desired amount of clamping force when the shank and sleeve head are in a particular orientation, the cam (40) can be removed from the fastener and the shank (238) and sleeve head (220) can be positioned in a different orientation with respect to the cup (10) to see if the desired clamping force can be obtained. Alternatively, if desired the sleeve (220) could be designed with a scalloped pattern to provide additional orientations that the sleeve (220) could be positioned in with respect to the cup (10). With this configuration, shanks could be provided in a variety of different sizes, external thread pitches, diameters, etc., so that the fastener can be customized to suit the specific application intended.

Similarly, in addition to the fasteners themselves and the sale of a variety of different pre-packaged fasteners with pre-determined specifications, the manufacture and sale of individual parts and fittings for the fasteners is contemplated as well in order to allow end users to further customize the fasteners as they desire. For example, if an end user wished to use a different conventional fastener for the embodiment discussed immediately above, the end user could move the pin (40) into the "up" position so that the pin (40) can be removed from the cup (10) and the fastener can be disassembled. Spare sleeves (220) and washers (230) could be provided for purchase that would give the end user this flexibility. Thus, if the end user originally purchased a collar in accordance with the embodiment discussed above that was meant for use with a hex head conventional fastener and later changed his or her mind and wanted a collar that worked with a conventional fastener via an interference fit, spare sleeve (220) and washer (230) parts of this type could be provided either separately or as a kit. Similarly, if an end user purchased a nut in accordance with the description of FIG. 2 above and wanted to change the thread pitch or type of bolt or screw the nut worked with, spare sleeves (220) and/or washers (230)*to* accommodate this request could be provided either separately or as a kit. Still another request may require differing locking forces where the end user could request varying washer (230) thicknesses to accomplish this.

For convenience, the embodiments of FIGS. 1A-M and 2A-M are illustrated without showing any actual deflection of the materials illustrated for each embodiment because it is contemplated that fasteners made in accordance with the concepts discussed herein could use deflecting or bending screw heads (30) or washers (230) or, alternatively, could use cam shafts (44) or cups (10) that deflect or bend, or even a combination of any of these in order to lock the fastener in place. In a preferred form, however, the screw head (30) and washer (230) are designed to deflect when the cam shaft (44) is rotated between the "up" and "down" positions (or unlocked and locked positions, respectively). For example, in FIGS. 4A-E, the embodiment of FIGS. 2A-M, is illustrated showing the washer (230) being deflected up when the cam shaft (44) is in the locking position. Often times this deflection will be so minimal that it is almost imperceptible to the ordinary observer, however, the downward force this puts on the cup (10) is very much appreciable and secures the fastener in place such that it resists loosening even when exposed to vibration. The screw head (30) of FIGS. 1A-M would operate in much the same way as the washer (230) in FIGS. 4A-E (e.g., with the screw head (30) deflecting up when the cam shaft (44) is moved from the released position of FIG. 1G to the locked position of FIG. 1M). As discussed in the paragraph immediately above, the washer (230) and screw head (30) can be provided in varying thicknesses to achieve the desired amount of downward force placed on cup (10). It also should be appreciated that varying amounts of clamping force can be asserted simply by deciding how tight to turn or rotate the fastener before actuating or moving the cam (40) from the unlocked or released position illustrated in FIGS. 1G and 2G to the locked or secured position illustrated in FIGS. 1M and 2M. For example, in some applications it may be sufficient to rotate the fastener until the bottom of ring (32) or sleeve (220) just barely engages the abutting surface of the piece the fastener is being rotated into engagement with while still allowing the fastener to not vibrate loose. This will likely make the cam (40) easy to maneuver between the unlocked and locked positions by leaving a bigger gap between the bottom of the cup (10) and the abutting surface so that the cup (10) can easily be moved into and out of engagement with the abutting surface when the cam (40) is moved between the locking and unlocking positions, respectively. In other applications, it may be desirable to rotate the fastener until the bottom of ring (32) or sleeve (220) thoroughly engages the abutting surface thereby making the cam (40) more difficult to maneuver between the unlocked and locked positions by leaving a smaller gap (if any) between the bottom of cup (10) and the abutting surface so that the cap (10) is harder to move into and out of engagement with the abutting surface. It should be understood that one benefit of keeping a gap between the bottom of the cup (10) and the abutting surface is to prevent the bottom of cup (10) from scraping or marring the abutting surface while the fastener is being rotated into further engagement with this surface. Thus, in the form illustrated, the scalloped design of the bottom of cup (10) only engages the abutting surface when the cam (40) is moved between the locked and unlocked position (or when the cup (10) is driven into and out of engagement with the abutting surface, respectively). However, as discussed above, in alternate embodiments the fastener may be designed so that the frictional design or surface of bottom of cup (10) engages the abutting surface earlier and digs into the surface to ensure that the cup (10) solidly engages the abutting surface and/or is prevented from rotating or moving with respect thereto.

In view of the above, it should be understood that many methods are also disclosed herein including but not limited to methods of manufacturing, methods of fastening, methods of doing business and the like. For example, disclosed herein are methods for manufacturing fasteners including a method for manufacturing a screw or bolt and a method for manufacturing a nut? In addition, disclosed herein are methods of fastening including a method for fastening a screw or bolt and a method for fastening a nut or collar? Still further, methods of doing business such as methods of packaging fasteners for sale are disclosed herein including a method of providing pre-packaged fasteners with pre-determined specifications and a method of selling customizable parts for the construction or assembly of customized fasteners for purchase. Similarly, it should be understood that the variety of alternate embodiments described above for each form of the faster could be used or implemented on any of the fasteners disclosed or contemplated by the disclosure herein.

It should also be understood that many different materials may be used to manufacture fasteners in accordance with the concepts discussed herein. In the embodiments illustrated and discussed above, the components may be constructed of materials including, but not limited to, 4140 quenched and tempered steel for the screw (30) illustrated in FIGS. 1A-M, oil hardened 1075 and 1095 spring steel and 200 series stainless steel for the washer (230) illustrated in FIGS. 2A-M and 4A-E, and ring (40). The cup can be machined from 1020, 1045, 12L14 4140 quenched and tempered steel and stainless steel. For mass production the sleeve (220) and the cup (10) could be injection molded out of zinc. Still in other lighter applications aluminum alloys could be used for components or a combination of aluminum and steel could be used. For example, in one form requiring a lighter fastener, everything except the spring washer (230) and the ring (40) could be provided in aluminum alloy. In yet other forms, polymers such as plastic may be used to construct fasteners in accordance with the concepts discussed herein or combinations of plastics and metal may be use to construct such fasteners.

In addition it should be understood that fasteners in accordance with the concepts discussed herein may be used for a variety of different applications. Some examples of applications for these fasteners include, but are not limited to, mounting hardware and components in the fields of photography, recreational equipment, industrial components, firearm accessories, automotive components, aircraft and aerospace. Any application that requires mounting or holding of a component to another or the closing of items by use of a fastener and is beneficial to lock and unlock without tools and create a holding force that is vibration resistant to loosening or un-tightening.

For example, in one specific application, scope mounts are sold for firearms that use thumb screws for securing the scope mount and ultimately the scope to the firearm. During use, conventional thumb screws often (if not always) loosen due to the vibration experienced by the screw during operation or repeated operation of the weapon. In later designs, such as in U.S. Pat. No. 7,694,450, an eccentric cam is used to align or adjust the fit of the optical mount to the side of a M14 rifle receiver but a mechanical fastener ultimately holds the mount to the M14s receiver. Thus, with this design tools are still required to tighten the mechanical fastener, such as wrenches or other means of adding torque, and the fastener itself remains susceptible to loosening due to the vibration that the fastener is exposed to during the operation of the firearm. In other designs, such as in U.S. Pat. No. 7,272,904, a throw lever connected to a tapered eccentric cam is used that engages the underside of a Weaver or Picatinney rail. This design is limited to only rail mounting systems and requires tools to adjust the ultimate holding force of the cam. Furthermore, it appears to also be susceptible to vibration and loosening as evident by the fact the same applicant has had to add a locking pin to the lever to prevent the lever from coming loose as disclosed in U.S. Patent Application No. 2006/0207156.

As is evident by the problems that are associated with the above referenced patents, there still remains a need to provide a fastener that allows the user to secure components to firearms or other bodies with a shock and vibration resistant holding force but without the need for tools. The locking fastener disclosed herein is different from prior art fasteners in at least one way because it possesses the ability to be tightened hand tight and then by use of a self contained cam lever, add an additional securing force to resist loosening due to shock and vibration. This design is flexible in that it can be used as a screw, nut or a receiver that accepts a variety of different pre-manufactured screws and bolts, giving the user many different configurations and sizes to choose from. This screw can easily be fit for use with many existing optical mounts currently on the market but would have the benefit of a fastener that does not require tools for assembly and provides a shock and vibration resistant holding force.

Figure 1G:
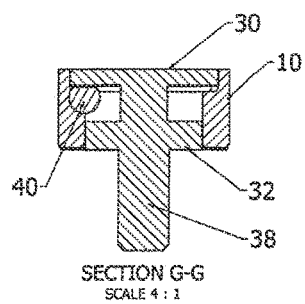
FIG. 1G is a cross-sectional view of the fastener of FIG. 1 taken along line G-G in FIG. 1D with the cam handle in the unlocked position.
Figure 1D:
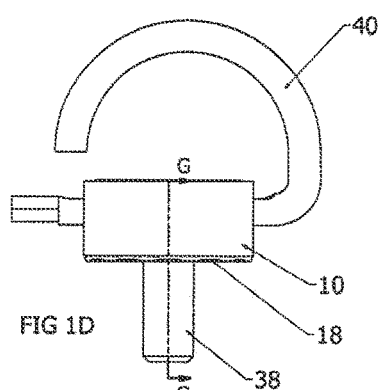
Figure 1F:
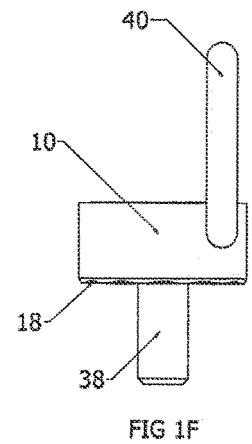
Figure 1E:
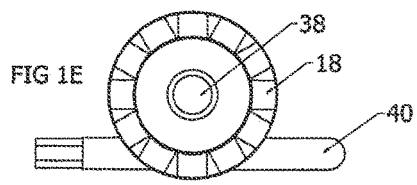
Figure 1H:
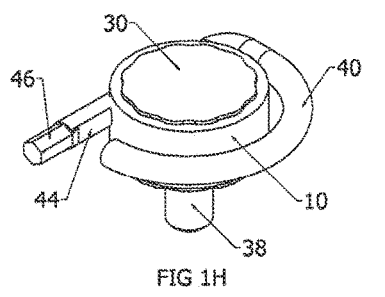
FIGS. 1H-L are perspective, plan, front elevation, bottom and side elevation views of the fastener of FIG. 1, respectively, with the cam handle in the locked position.
Figure 1I:
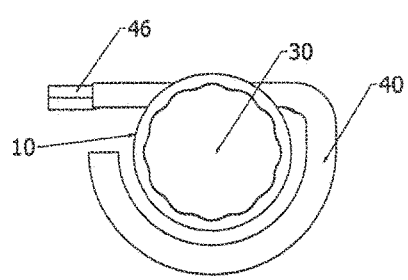
Figure 1M:
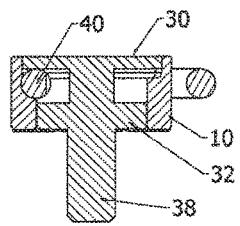
FIG. 1M is a cross-sectional view of the fastener of FIG. 1 taken along line M-M in FIG. 1J with the cam handle in the locked position.
Figure 1J:
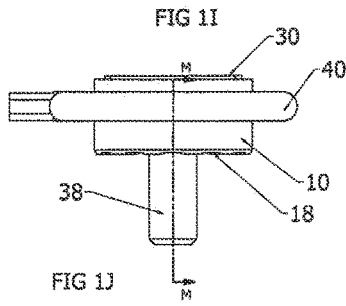
Figure 1L:
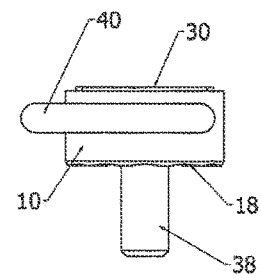
Figure 1K:
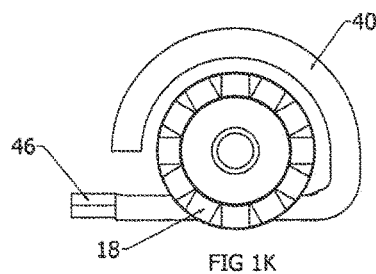
Figure 2A:
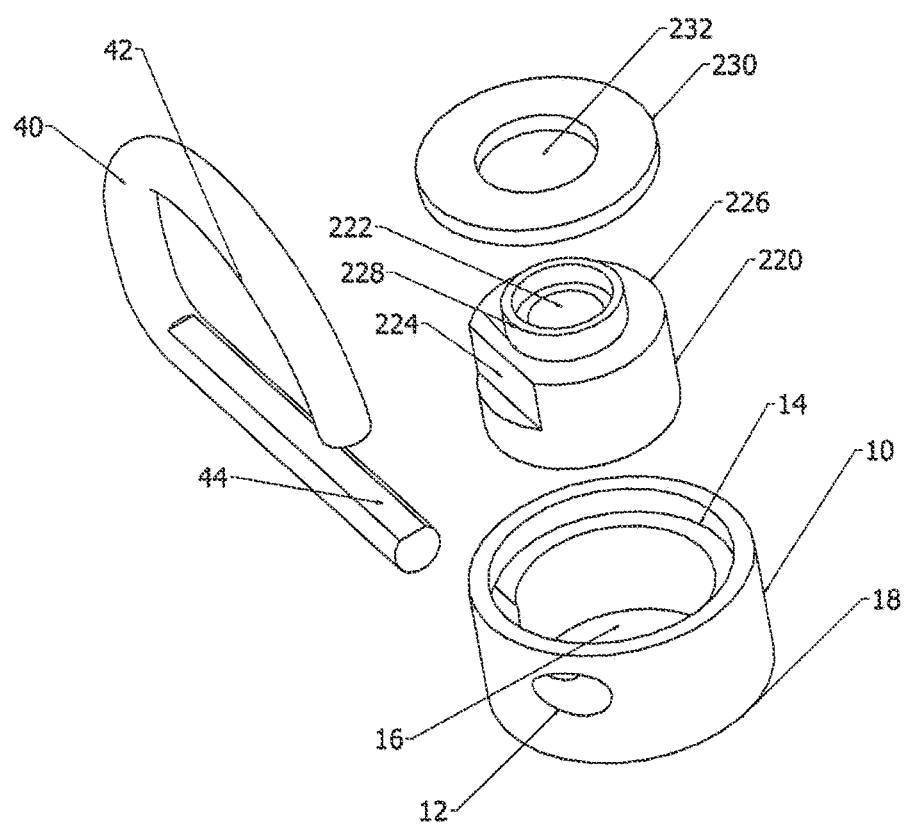
FIG. 2A is an exploded view of a nut type fastener in accordance with another form of the present invention.
Figure 2B:
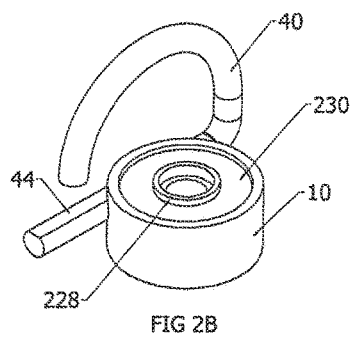
FIGS. 2B-F are perspective, plan, front elevational, bottom and side elevational views of the fastener of FIG. 2, respectively, with the cam handle in the unlocked position.
Figure 2C:
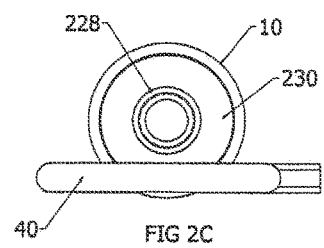
Figure 2G:
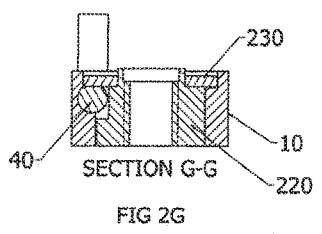
FIG. 2G is a cross-sectional view of the fastener of FIG. 2 taken along line G-G in FIG. 2D with the cam handle in the unlocked position.
Figure 2D:
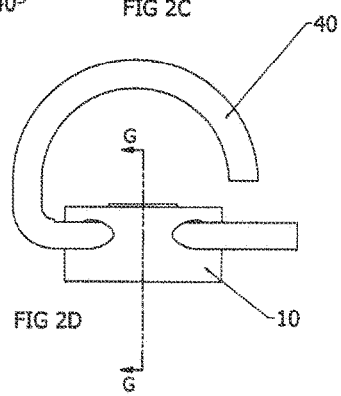
Figure 2F:
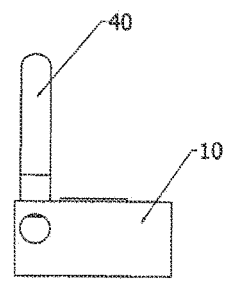
Figure 2E:
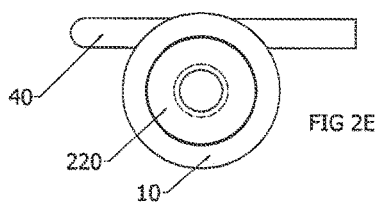
Figure 2H:
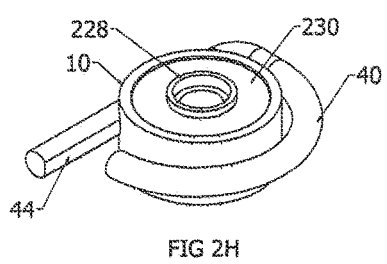
FIGS. 2H-L are perspective, plan, front elevation, bottom and side elevation views of the fastener of FIG. 2 with the cam handle in the locked position.
Figure 2I:
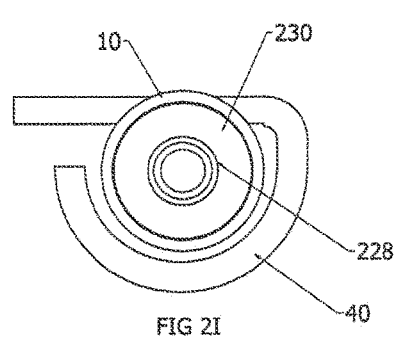
Figure 2M:
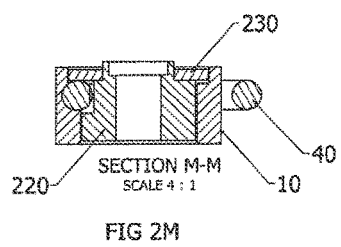
FIG. 2M is a cross-sectional view of the fastener of FIG. 2 taken along line M-M in FIG. 2J with the cam handle in the locked position.
Figure 2J:
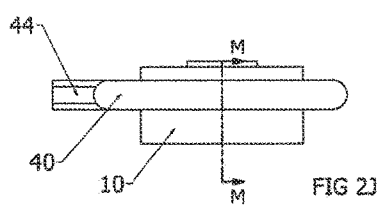
Figure 2L:
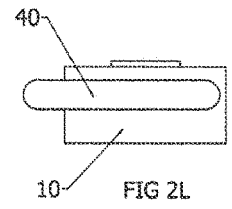
Figure 2K:
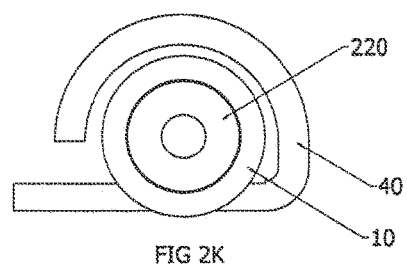

In FIGS. 5A-B, scope mounts in accordance with the invention are illustrated for a rifle, such as an M1A or M14 rifle, which use a fastener similar to that illustrated in FIGS. 1A-M in place of the conventional thumb screw that would otherwise be used for such application. In the embodiment illustrated in FIG. 5A, a Weaver style scope mount (400) is shown having a bracket, such as side plate or receiver plate (402), and a base, such as scope mounting bracket (404), with Weaver style scope rings (406 and 408) for connecting a scope to the scope mount (404). The side plate (402) is connected to the rifle via the fastener of FIGS. 1A-M by unlocking the fastener (as shown in FIG. 1G) and rotating the fastener until the bottom of ring (32) engages the abutting surface of the side plate (402) and then rotating the cam (40) into the locked position (as shown in FIG. 1M) using handle (42) so that the bottom of cup (10) is driven into engagement with the abutting surface to lock the fastener in position or place. Once connected in this manner, the fastener will resist loosening due to vibration experienced during operation of the firearm thereby keeping the scope mount and scope securely fastened to the firearm. The tool end 46 of the cam (40) is equipped with a hex key for tightening and loosening hex head socket screws used elsewhere on the rifle and/or the rifle mount (e.g., like those used to secure the scope rings (406 and 408) to the scope mount (404) and those used to secure the side panel (402) to the scope mounting bracket (404), etc.). An additional benefit of the illustrated scope mount design is that it positions the scope low over the barrel of the rifle so that the rifle operator gets a comfortable and accurate scope position to use while firing.

In the embodiment illustrated in FIG. 5B, a Picatinny style scope mount (430) is shown having a side plate (432) and a scope mounting bracket (434) each with a row of picatinny rails (432a) and (434a), respectively. The scope mount (430) may be connected to the rifle using a fastener like the one illustrated in FIGS. 1A-M in a manner similar to that discussed above with respect to scope mount 400. In the form illustrated, the picatinny rails (432a and 434a) form a tenon for mating with a corresponding mortise or mortises located on accessories to be attached to the rails in a tenon and mortis or dovetail configuration. In this form, scope rings would be connected to the picatinny rail (434a) of the scope mount bracket (434) while other accessories, such as flashlights, laser pointers, laser range finders, etc., could be attached to the picatinny rail (432a) of the side plate (432).

Although the scope mounts illustrated have been Weaver style and Picatinny style, it should be understood that fasteners in accordance with the concepts disclosed herein could be used on many other styles of scope mounts (e.g., 22 rings/Tip-off rings/dovetail rings, Redfield/Leupold style mounts, dual dovetail systems, clamp-on mounts, etc.), as well as many other completely different applications beyond just scope mounts. For simplicity and convenience, U.S. Pat. Nos. 7,694,450 and 7,272,904 and U.S. Patent Application No. 2006/0207156 are hereby incorporated herein by referenced in their entirety, rather than reciting several paragraphs that would end up being redundant to that which is disclosed in these documents.

In still other embodiments, the fastener disclosed herein may be equipped with additional items, such as an outer sleeve, to help assist in the operation of the fastener and/or identify the type of fastener or application the fastener is suited for. For example, an outer sleeve made of a polymeric material (either natural or synthetic), such as a plastic or rubber, may be used to surround the fastener and assist in holding the locking pin in place (e.g., holding the pin in the position it is left in by a user and/or prevent the pin from sliding out of the fastener). This sleeve may also protect the fastener and/or the surrounding environment (e.g., the surface or surfaces to which the fastener is being attached). In addition, the sleeve may be provided in a variety of different colors to customize the fastener or designate some property of the fastener or its intended application (e.g., providing a user preferred design, designating thread pitch, threaded shaft size, spring tension, metric/English, etc.). Methods associated with the addition of this outer sleeve and/or its uses are also contemplated.

Figure 6:
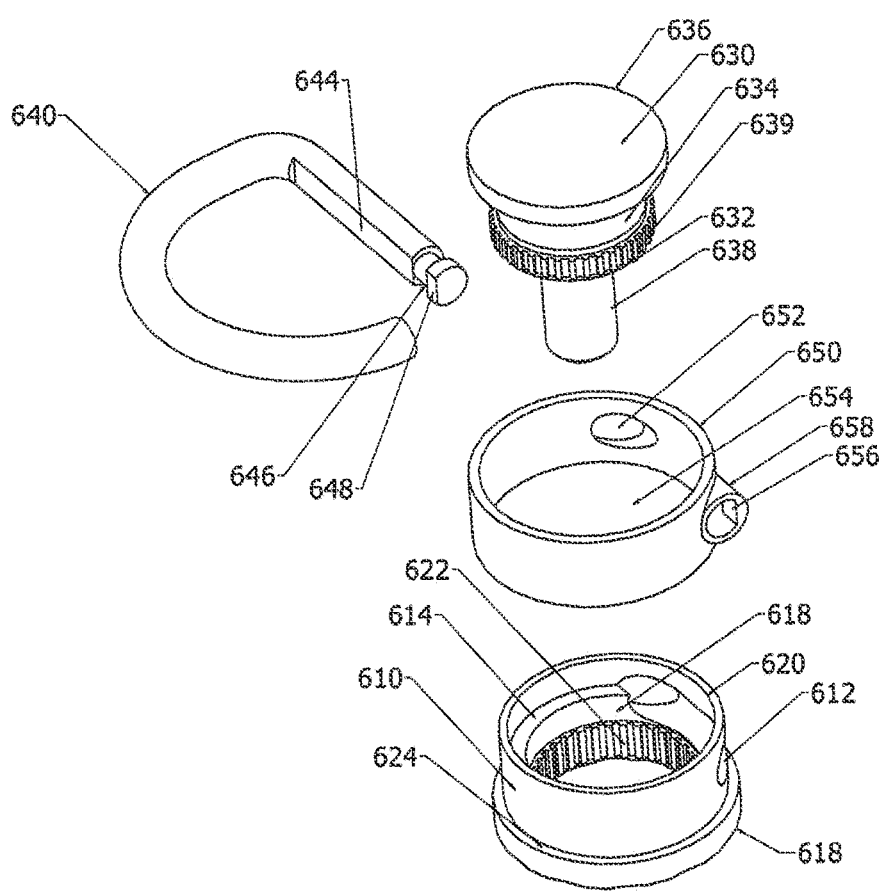
FIG. 6 is an exploded view of a screw type fastener in accordance with one form of the present invention illustrating an additional sleeve.
Figure 8A:
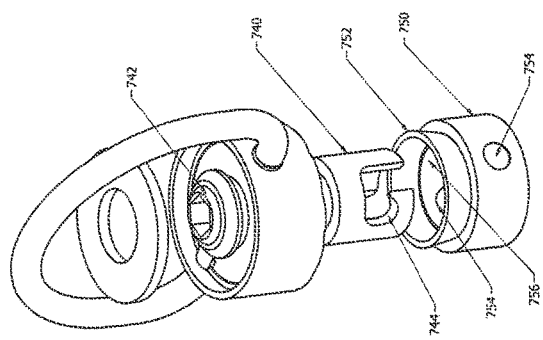
Figure 7A:
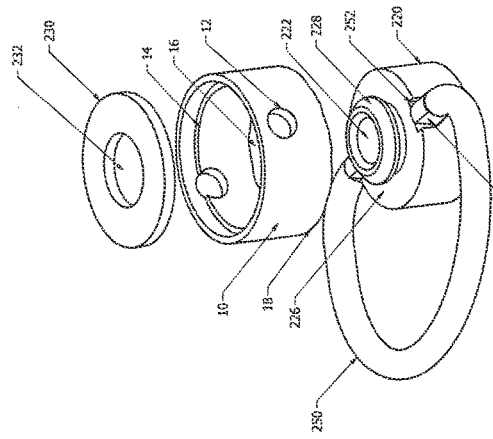
Figure 9:
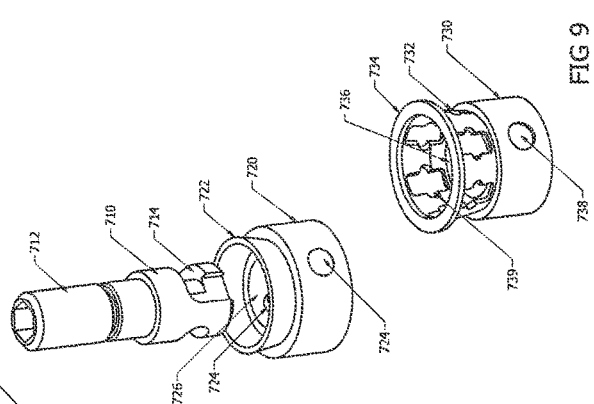
FIG. 9 is a perspective view of an alternate receiver in accordance with another aspect of the present invention.

An example of such an alternate embodiment is illustrated in FIG. 6. For convenience, items that are similar to those discussed above will use similar two-digit reference numerals, however, with the addition of the prefix "6" simply to distinguish one embodiment from another. The embodiment illustrated in FIG. 6 shows a variation of the previous fastener embodiments with the addition of a spline pattern (639) on the shoulder (632) of screw (630) which meshes or mates with the spline pattern (622) of cup (610). This spline engagement prevents the screw (630) from rotating with respect to the cup (610), similar to the rosette engagement of the embodiment shown and discussed in FIGS. 1A-H above. The embodiment of FIG. 6 also shows the addition of a sleeve (650) which is fitted to the cup (610) and abuts to the shoulder (624) of the cup (610). The sleeve (650) provides a means of capturing the locking pin (640) by means of a key (656) inside the sleeve passage (652) that engages a groove (646) in the end of the locking pin (640). Thus the locking pin (640) is prevented from sliding forward or aft along the secondary axis normal to the primary axis of the fastener. Only by rotating the locking pin (640) to a specific orientation relative to the sleeve key (656) and the locking pin flat (648) is it possible to remove or insert the locking pin (640) past the sleeve key (656). This engagement prevents involuntary disassembly of the fastener components. By means of a slightly undersized sleeve hole (652) compared to the locking pin diameter (640), the locking pin (640) resists rotating when engaged in the sleeve hole (652). This resistance keeps the locking pin in a set orientation until the user chooses to move or rotate the locking pin (640). The sleeve (650) being made of a compliant material also provides abrasion resistance to other surfaces that may come into contact with the screw assembly, as well as providing a means of color coding.

As mentioned above, a variety of sleeve colors or designs may be used to customize and/or differentiate one fastener type from another. For example, different colors could allow the end user to specify varying bolt grip force, different threads, different measurement systems or scales, etc. For example, a line of fasteners may be provided using different colors to designate metric fasteners from Imperial fasteners. In another form, different colors may be used to differentiate between fasteners of varying grip force or spring tension. In other forms, different colors may be used to designate different thread pitches or different fastener sizes. In still other forms, different colors may be used simply to allow the user to customize his or her bolts for a desired purpose. For example, fasteners may be contracted for and purchased in a specific color in keeping with a consumer's desired trade dress or color scheme for a particular product or product line. Alternatively, an on-demand customization business model may be adopted (whether pre or post sale) that allows consumers to designate specific designs or colors they wish the sleeve to be produced in. For example, a particular camouflage design may be requested by a hunting or sporting goods chain for fasteners to be sold in their stores, or a particular design/pattern may be requested by a rifle scope manufacture for fasteners to be sold with their scope mounts.

As illustrated in FIG. 6, the sleeve (650) may also be configured to be symmetric along the secondary normal axis of the primary fastener axis so it can be orientated to be left or right handed. Thus, in the embodiment illustrated, the fastener is shown configured for a left-handed person, however, the outer sleeve (650) could be flipped over and the actuator (640) repositioned to align with the sleeve so that the fastener is more comfortable for a right-handed person to use. It should also be noted that the spline and or sleeve is not restricted to the view shown in FIG. 6 and could be used in combination with any of the previous embodiment discussed.

In FIG. 6, the fastener is illustrated with the handle or actuator (40) in a locked or lowered position so that the flat (644) is positioned away from the lower surface of the fastener head (630). In this configuration (assuming assembled and not exploded as shown), the actuator (640) cams against the fastener head (630), thereby increasing frictional engagement between the fastener head (630) and the cup (610) and between the lower surface (618) of cup (610) (and optionally ring (632) as mentioned above) and the surface to which the fastener is connected. In this embodiment, the actuator (640) cannot be removed from the fastener and the fastener assembly cannot be disassembled while the actuator (640) is in this position.

The actuator (640), could be rotated ninety degrees from the position illustrated in FIG. 6 to an upright position (similar to that shown in FIGS. 1A-G and 2A-G for prior embodiments) to put the actuator (640) in an unlocked position so that the flat (644) is positioned near or adjacent the lower surface of fastener head (630). In this configuration, no cam effect is applied to the cup (610) or head (630) and the fastener can be rotated (e.g., tightened, loosened, etc.) with respect to the surface to which the fastener is connected. However, unlike the embodiments illustrated in FIGS. 1A-2M, the actuator (640) would not be removable from the fastener and/or the fastener could not be disassembled simply by placing the actuator (640) in the upright position. Rather, in view of the shape/configuration of key opening (656) of the sleeve passage (658), the actuator (640) would have to be rotated another ninety degrees (or one hundred and eighty degrees from that shown in FIG. 6) in order to align the flat (644) with the corresponding flat wall of key 656 in order to remove the actuator (640) from the fastener and/or disassemble the fastener. It should be understood that when the actuator (640) is in this position (e.g., one hundred eighty degrees from that illustrated in FIG. 6), there could be a camming force applied between the actuator (640) and fastener head (630). However, in a preferred form and so long as the fastener has been unscrewed from tight engagement with the surface to which it is being connected, the fastener materials will provide sufficient give to allow for the actuator (640) to be removed from the cup (610) and outer sleeve (650) so that the fastener can be disassembled.

In yet another form, the outer sleeve (650) may be configured to cover more of the fastener if desired. For example, in one form, the outer sleeve (650) may form a cover that covers at least a portion of the screw or bolt head (630) in order to keep the screw or bolt captured within the cup (610). In this way the outer sleeve (650) not only helps keep the actuator (640) connected to the fastener, but also helps keep other portions of the fastener assembled or connected. In another form, the outer sleeve (650) may alternatively or in addition, cover at least a portion of the bottom of the cup (610) (or sleeve if implemented in a nut type fastener embodiment like that illustrated in FIGS. 2A-M). This would further assist in making the fastener a non-marring type fastener to protect the outer surface of the structure to which the fastener is being connected. For example, in one form the outer sleeve (650) may form an outer cup type structure into which at least a portion of cup (610) is disposed. The bottom wall of the outer cup type structure would define an opening through which the shank (638) of the fastener would be disposed and would preferably be thin and tight enough that the scalloped pattern (618) of cup (610) (or any other texture or design that appears on the bottom thereof) would be replicated on the bottom of the outer sleeve (650) to provide similar benefits as those discussed above with respect to the addition of these patterns, textures or designs. In this way the outer sleeve (650) forms a coating applied to an exterior surface of the fastener to prevent the fastener from marring or abrading a surface to which the fastener is connected. It should also be understood that in other forms, the cup (610) and sleeve (650) may be integrated into one component if desired.

In another form, the invention may comprise a fastener such as a nut with a cup, sleeve, washer and a cam locking mechanism as illustrated in FIGS. 7A-10E. In this embodiment, the fastener is designed with a cup (10), a sleeve (220), a washer (230) and pin (250) similar to those discussed above with respect to FIGS. 2A-M, however, the fastener uses a centered pin cam actuator (250) that engages both recesses, openings or pockets (252) in sleeve (220) on both sides. The center pin (250) prevents, hinters or retards the sleeve (220) and cup (10) from rotating with respect to each other (or one another). The bottom of pockets (252) serve as a surface which engages the pin (250) when inserted through the alignment holes (12) of cup (10). The inner collar (228) is coaxially aligned with the remainder of the sleeve (220) and has an inner opening that is larger in diameter than at least a portion of the remaining opening (222) defined by the sleeve (220) in order to form an inner shoulder or step within the diameter of the inner collar (228). In a preferred form the inner collar comprises a tubular rivet which the washer (230) can be positioned about via opening (232) and then the collar can be deformed (e.g., upset or bucked) to secure the washer (230) to the sleeve (220). The sleeve (220) can also include a friction element (760) that is comprised of a polymer pin that applies resistance to a threaded component inserted into opening (222). The friction element (760) is inserted into a hole that is drilled perpendicular to the primary axis of the sleeve opening (222). It should be understood that a variety of different substances and structures may be used for frictional element (760) (e.g., patches of nylon or other materials melted to the threads, buttons of nylon materials like NYLOK buttons or other similarly useful materials), that these may take on a variety of different shapes and sizes, and/or may be located in a variety of different positions on the fastener.

With the washer (230) and sleeve (220) connected and inserted inside the cup (10), at least a portion of the locking pin (250) can be passed through the alignment holes (12) in the cup (10), effectively holding all four pieces of the assembly together. In the form illustrated, the remaining opening (222) of sleeve (220) may be threaded or partially threaded in order to accept a mating fastener such as a bolt or screw. Thus, when the D shaped cross section portion (254) of the locking pin (250) is in the "up" position or with the flattened portion (254) facing up (see FIG. 10C cross-section) the nut can be threaded onto the mating screw or bolt and when the nut is hand tight, the D clip can be rotated to the "down" position where the flattened portion (254) is not facing up (see FIG. 7A), effectively increasing the distance between the bottom of the cup (10) and the washer (230) thereby causing the downward pressure on the nut to secure the nut and its mating fastener in position. As in FIG. 7A, this increase in thickness (relating to the cam action of the pin (250)) is sized to create a substantial amount of force on the cup (10), effectively torquing the nut against the surface adjacent the nut and through which the mating fastener has been inserted.

Although a rivet configuration is used to secure the washer (230) to the sleeve (220), it should be understood that other fastening techniques and configurations may be used to secure the washer (230) to the sleeve (220) (e.g., interference fit, pin or pins inserted through the collar (222) above the washer to secure the washer to the sleeve (220), set screws or simply posts threaded above the washer to prevent its removal, detents on the collar that the washer gets pressed over and then secured on the sleeve thereby, ball and detent configurations, etc.). In fact in other embodiments, the washer (230) may be formed integrally with the sleeve (220) so long as the washer (230) continues to allow the appropriate amount of deflection required to allow the necessary movement of the pin (250) to take place (e.g., to allow the above described cam or camming action to take place). If desired, the fastener could be designed such that the sleeve with integral washer could then be interference fit into the cup (10). In still others forms, the washer may be replaced with a threaded cap that screws onto the collar (228) and provides a surface for capturing the pin (250) while still allowing for deflection (e.g., if the fastener nut is not setup with the pin to deflect). In still other forms, the fastener may be configured with a partially enclosed cap (10). For example, in such an embodiment the washer (230) may be inserted into the bottom of the cap with the cap being used to retain the washer, but still having a center opening through which the shank, stud or post (710) is disposed.

It also should be understood that although the cup (10) and sleeve (220) are illustrated as having cylindrical configurations, these parts could take various other sizes and shapes in alternate embodiments if desired. For example, both the cup (10) and sleeve (220) could be configured with square or rectangular shapes. In one form, the shape of the sleeve (220) may be configured so that it matches a mating shape of the inner opening of the cup (10) so that the sleeve (220) cannot be rotated with respect to the cup (10) (or rotated separate and apart from the cup (10)) when disposed within the cup (10).

Thus, in the embodiment of FIGS. 7A-10E, a self locking nut type fastener is disclosed that is self-contained and resists loosening even when used in applications and environments where the fastener is exposed to vibration or shock. Unlike conventional fasteners, the cam actuator (250) is contained within the cup (10) and does not need to come into direct contact with the article that is being fastened. When actuated the cam actuator (250) applies force on the cup (10) to engage an external surface of one of the articles being fastened thereby causing the articles to be secured or clamped together so that one cannot move with respect to the other. In the form illustrated the washer (230) serves as a spring that allows the fastener to apply the force on cup (10) which ultimately causes the clamping of the articles being fastened together.

In yet another form, the invention may comprise a collar similar to the nut configuration illustrated in FIGS. 7A-10E, but which may be used with a conventional fastener such as a screw or bolt to form a self locking fastener. For example, in the form illustrated in FIGS. 3A-C, a conventional screw or bolt could be inserted into the central opening (222) of the sleeve (220) so that the assembled component would look somewhat similar to the assembly of FIG. 1 and could be screwed or threaded into a mating opening when the pin (250) is in the "up" position or with the flattened portion (254) facing up, tightened until hand tight, and then locked into position by rotating the pin (250) into the "down" position or with the flattened portion (254) in a position other than facing up. The conventional screw or bolt could be captured within or by the inner collar (228) during the deforming step of the tubular rivet so that the upsetting or bucking of the rivet (228) not only secures the washer (230) to sleeve (220), but also provides an obstruction preventing the conventional fastener from being removed from the inner opening (222) of sleeve (220).

A portion of the central opening (222) of the sleeve (220) could also be configured to have a shape that mates with the head of the conventional fastener to ensure that the conventional fastener will rotate along with the rotation of the sleeve (220) and/or cup (10) and not independently of one and/or both of these parts. For example, in one form at least a portion of the central opening (222) may form a hexagonal socket within which the hex head of a conventional fastener is inserted (e.g., disposed or nested) so that the conventional fastener cannot be rotated independent of the sleeve (220). Other mating configurations or shapes could alternatively be used as discussed above with respect to the mating shapes of the screw head (30) and cup opening (20) of FIGS. 1A-M. For example, the conventional fastener could be interference fit (e.g., press fit, friction fit, etc.) into the inner opening (222) of sleeve (220) so that it does not rotate with respect to the sleeve (220) and/or cup (10). In one such form, the head of the conventional fastener may be star shaped (or starred) and press fit into the sleeve (220) like a press fit nut. In yet other embodiments, the fastener may comprise a threaded shank (238) disposed in sleeve (220) and secured thereto via a set screw (239) as shown in FIG. 3A. The sleeve (220) may also be designed with a shape that accommodates conventional tools, such as the rectangular head configuration illustrated which can be rotated using conventional sockets, pliers or wrenches, or alternate designs such as sockets for conventional screwdrivers. Besides providing a flat surface to prevent rotation of the sleeve (220) and shank (238) from rotating with respect to the cup (10) when the cam (250) is inserted through the openings (12) of the cup (10) and the fastener is fully assembled, another advantage to the rectangular shaped sleeve head illustrated in FIG. 3A is that the sleeve (220) can be positioned in one of four different orientations with respect to the cup (10) and the cam (250).

Now turning back to FIG. 7A-10E an alternate threaded body that can be inserted (threaded) into the opening (222) of sleeve (220) is a fractional turn fastener, such as quarter turn stud (710 and 740). These studs are comprised of a threaded portion (712 and 742 respectfully) that match the threads (222) in sleeve (220) and a pin receiver (714 and 744 respectfully). These studs work in conjunction with a socket such as the panel mount inserts (720 and 750) and rivet insert (730). The panel mount (720 and 750) and rivet insert (730) contains mating features such as pins (724, 754 and 738) that engage a groove (714) or slot (744) in the threaded studs (710 and 740). To engage the studs (710 and 740) with their mating insert (720, 730 and 750), the grooved (714) or slotted (744) portion of the studs are aligned with openings (726, 756 and 736) and clocked with the pins (724, 754 and 738). Once aligned the studs are pushed into the mating insert and turned until they are fully engaged (when they will no longer turn). When used with a threaded fastener such as that in FIG. 7A-10E they form a fractional turn fastener. The rivet insert (730) is an alternate mount that may be used in place of press fit or friction fit panel mounts (720 and 750).

Figure 13:
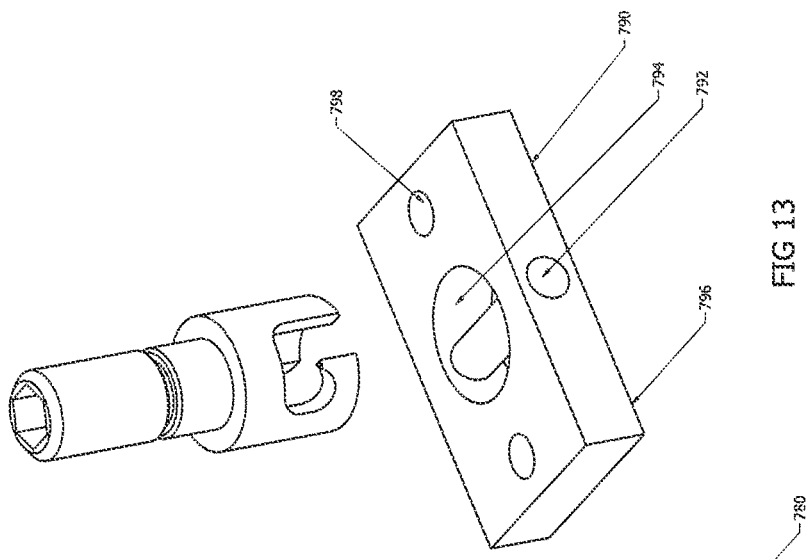
FIG. 13 is an exploded view of an alternate fractional turn assembly in accordance with another embodiment of the invention illustrating a weld plate with full pin engagement.
Figure 12:
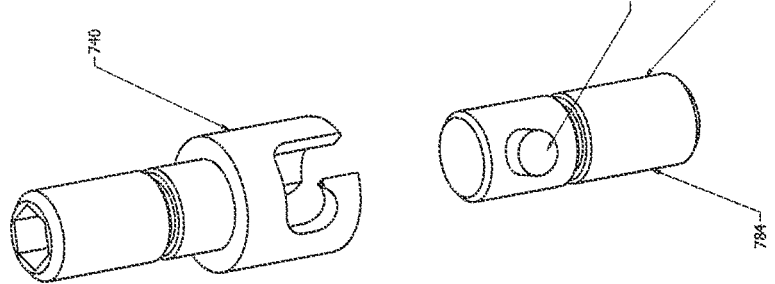
FIG. 12 is an exploded view of an alternate fractional turn assembly in accordance with another embodiment of the invention illustrating a threaded receiver having an external pin engagement.
Figure 11:
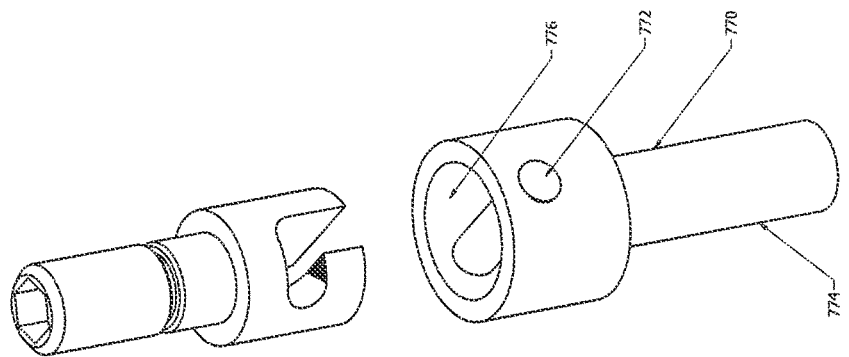
FIG. 11 is an exploded view of an alternate fractional turn assembly in accordance with another embodiment of the invention illustrating a threaded receiver defining a socket with a full length pin engagement.

Still other forms of fractional turn components are shown in FIG. 11-13 where stud (740) is shown with several forms of receivers that will engage the stud (710 and 740) similar to above. However, it should be appreciated that several alternate forms of receivers may be used in keeping with the concepts of the invention disclosed herein. The threaded receiver (770) in FIG. 11 shows a threaded portion (774) that could be attached to a body to be fastened. The pocket (776) would serve to contain pin (772) and work as a socket to receive the slotted portion of stud (740). FIG. 12 shows a similar receiver stud with a threaded portion (784) that does not possess a socket but has an exposed pin (782) that engages the slot of stud (740). Still another form of receiver is the weld plate (790) in FIG. 13. The weld plate consists of a plate (796) made of weldable material such as hot roll or stainless steel, or aluminum, a pin (792), a receiver hole (794) and additional mounting holes (798). This plate could be attached to a mating body using welds, screws or rivets. It serves as a receiver similar to that of FIG. 11.

Figure 14B:
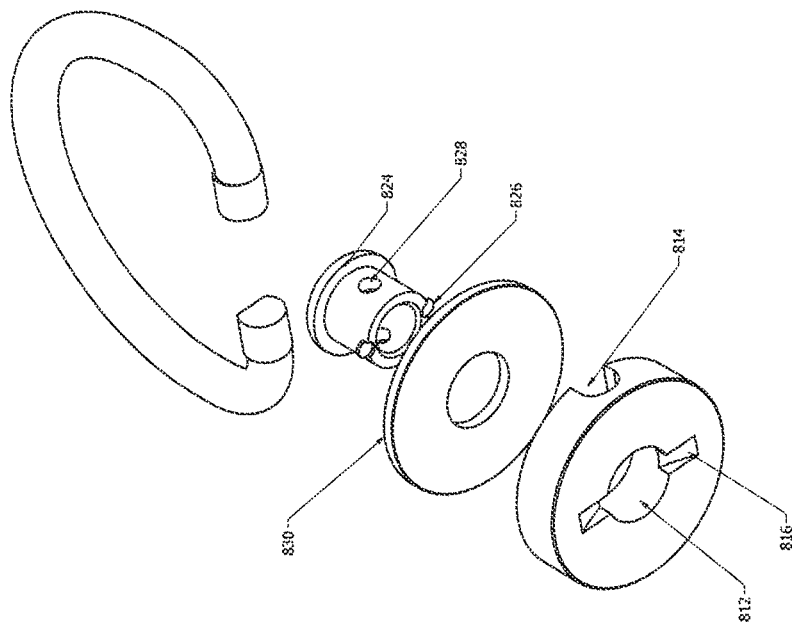
FIGS. 14A-M comprise a plurality of views of an alternate fastener in accordance with another embodiment of the invention illustrating a fastener with a threaded insert, sleeve, washer and cam locking mechanism or actuator.
Figure 14A:
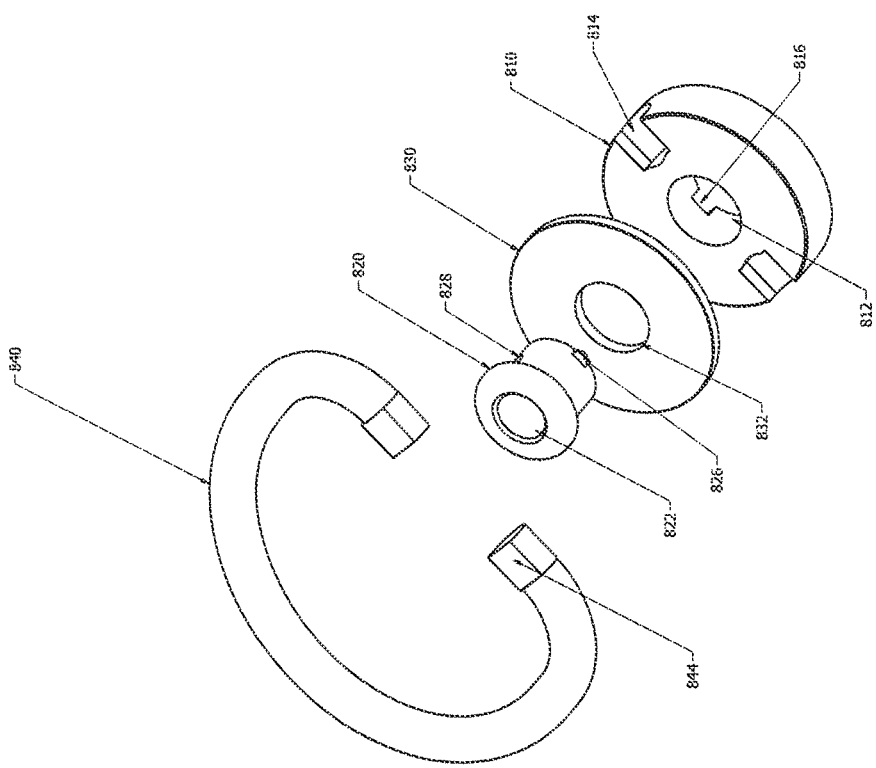
Figure 14I:
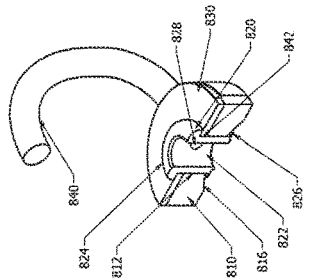
Figure 14G:
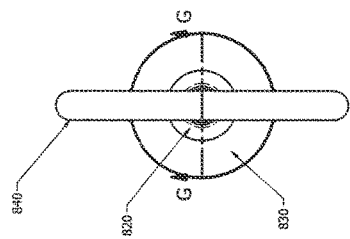
Figure 14H:
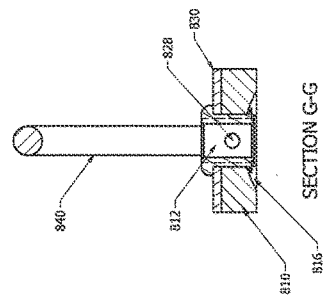
Figure 14E:
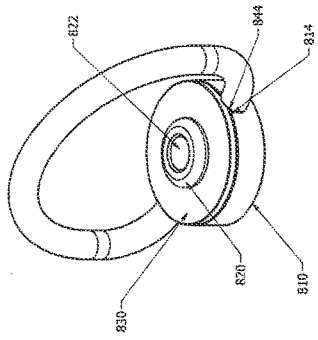
Figure 14F:
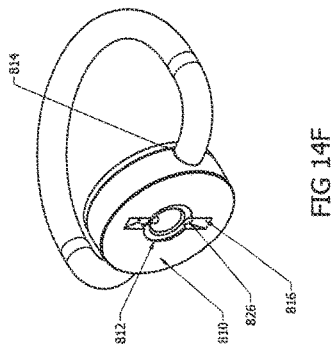
Figure 14C:
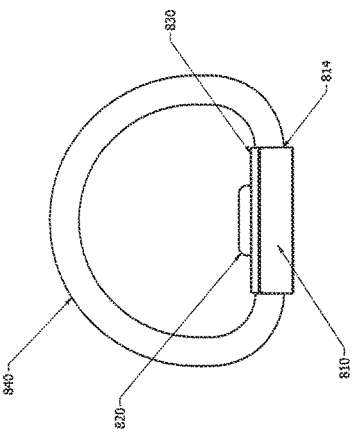
Figure 14D:
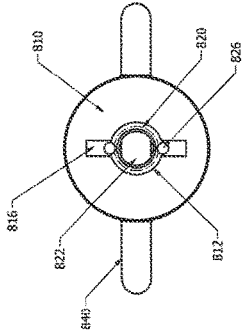
Figure 14L:
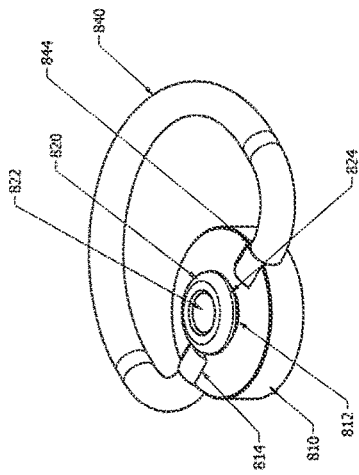
Figure 14M:
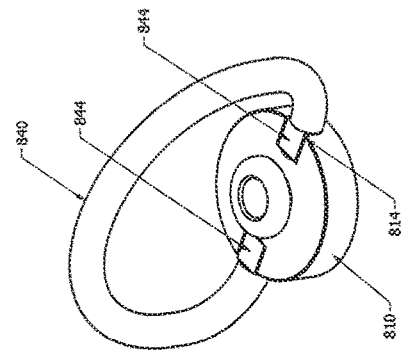
Figure 14J:
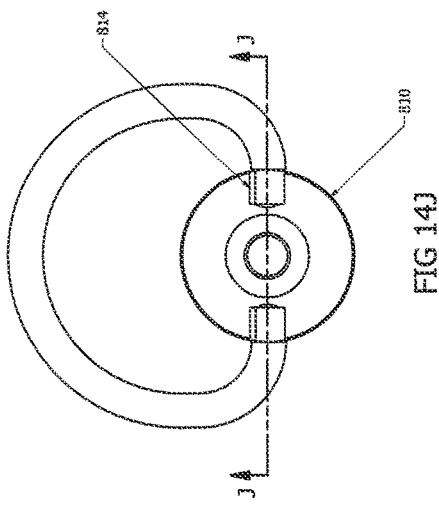
Figure 14K:
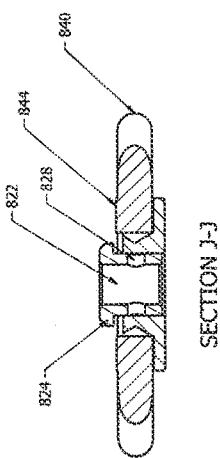

In another form, the invention may comprise a more simplistic fastener such as a nut with a threaded insert, sleeve, washer and cam locking mechanism as illustrated in FIGS. 14A-M. In this embodiment, the fastener is designed with an insert (820), a sleeve (810), a washer (830) and pin (840) similar to those discussed above with respect to FIGS. 7A-10E, which uses a centered pin (840) that engages both pockets (814) in sleeve (810) on both sides. The bottom of pockets (814) serve as a surface which engages the pin (840). The insert (820) is coaxially aligned with the opening (812) of the sleeve (810) and fitted with a slip fit with opening (812) defined by the sleeve (810) in order to allow the insert (820) to freely move axially within the opening (812). In the form illustrated, the opening (822) of sleeve (820) may be threaded or partially threaded in order to accept a mating fastener such as a bolt or screw. The insert (820) can also include a friction element inserted into opening (828) that is comprised of a polymer pin that applies resistance to turning of a threaded component inserted into opening (822). The friction element is inserted into a hole that is drilled perpendicular to the primary axis of the sleeve opening (822). It should be noted that other means of frictional elements could be applied to either the opening (822) or to the threaded component that engages opening (822). These other means could be in the form of a nylon patch melted to the threads or a nylon button attached such as Nylok. When assembled the shank of the insert (820) will pass through the opening (832) of washer (830) and the opening of (812) of sleeve (810). The head (824) of insert (820) is a larger diameter than the opening (832) of washer (830) therefore containing the washer (830). In a preferred form once assembled the bottom rim of the insert (820) can be deformed (e.g., upset or bucked) creating lobes (826) to secure the insert from slipping out of the sleeve (810) via containing the lobes (826) inside a groove (816) of sleeve (810). The lobes (826) are formed such that they allow some axial movement of the insert (820) with respect to the sleeve (810). The lobes (826) also serve to restrict the sleeve (810) from rotating with respect to the insert (820). Thus, when the D shaped cross section portion (844) of the locking pin (840) is in the "up" position or with the flattened portion (844) facing up (see FIG. 14E) the nut can be threaded onto the mating screw or bolt and when the nut is hand tight, the D clip can be rotated to the "down" position where the flattened portion (844) is not facing up (see FIG. 14L), effectively increasing the distance between the bottom of the sleeve (810) and the washer (830) thereby causing an upward force on the insert (820) and downward pressure on the nut to secure the nut and its mating fastener in position. As in FIG. 14K, this increase in thickness (relating to the cam action of the pin (830)) is sized to create a substantial amount of force on the sleeve (210), effectively torquing the nut against the surface adjacent the nut and through which the mating fastener has been inserted.

In another form, the invention may comprise a device for plugging openings such as an oil plug with a cup, plug, washer, O-ring and a cam locking mechanism as illustrated in FIGS. 15A-E. In this embodiment, the fastener is designed with a cup (910), a plug (920), a washer (930) and pin (940) similar to those discussed above with respect to FIGS. 7A-10E. The fastener uses a centered pin (940) that engages both pockets (914) in plug (920) on both sides that prevents, inhibits or retards the plug (920) and cup (910) from rotating with respect to each other. The bottom of pockets (914) serve as a surface which engages the pin (940) when inserted through the holes (912) of cup (910). The inner collar (928) is coaxially aligned with the remainder of the plug (920). In a preferred form the inner collar (928) comprises a tubular rivet which the washer (930) can be positioned about via opening (932) and then the collar can be deformed (e.g., upset or bucked) to secure the washer (930) to the plug (920). With the washer (930) and plug (920) connected and inserted inside the cup (910), at least a portion of the locking pin (940) can be passed through the alignment holes (912) in the cup (910), effectively holding all four pieces of the assembly together.

Figure 15A:
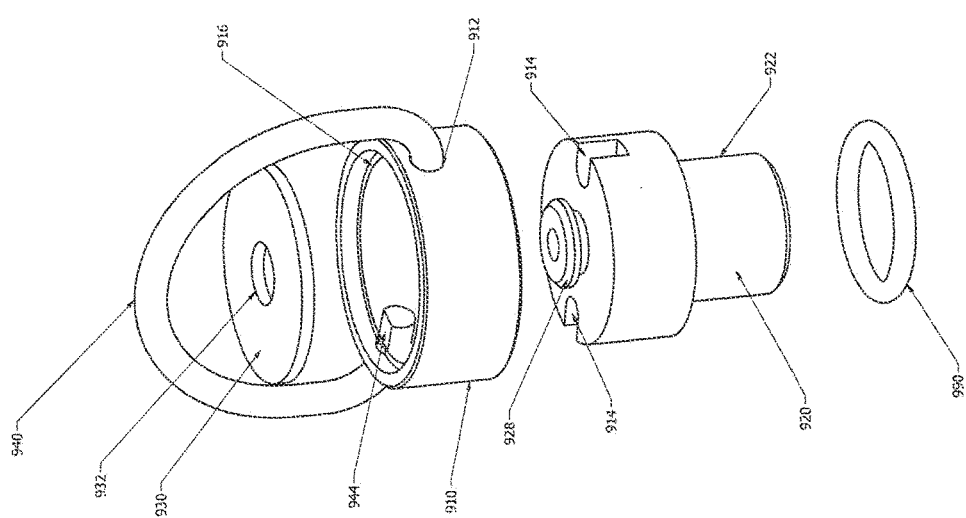

In the form illustrated, the plug also contains a groove (926) (shown in FIG. 15C). Where an O-ring (990) can be disposed. The O-ring (990) is used to form a liquid tight seal between the plug (920) and a mating surface such as an oil pan when the plug is threaded (922) into a drain opening of the oil pan. It should be mentioned that an O-ring is illustrated here but other types of seals could be used such as rubber or plastic gaskets or crush rings. Thus, when the D shaped cross section portion (944) of the locking pin (940) is in the "up" position or with the flattened portion (944) facing up (see FIG. 15A) the plug can be threaded into a drain opening and when the plug is hand tight, the D clip can be rotated to the "down" position similar to that shown in FIG. 14J-M where the flattened portion (944) is not facing up effectively increasing the distance between the bottom of the cup (910) and the washer (930) thereby causing the downward pressure on the plug to secure the plug and its mating surface in position. This increase in thickness (relating to the cam action of the pin (940)) is sized to create a substantial amount of force on the cup (910), effectively torquing the plug against the surface adjacent the plug and through which the plug has been inserted.

Although a rivet configuration is used to secure the washer (930) to the plug (920), it should be understood that other fastening techniques and configurations may be used to secure the washer (930) to the plug (920) (e.g., a screw, interference fit, pin or pins inserted through the collar (928) above the washer to secure the washer to the plug (920), set screws or simply posts threaded above the washer to prevent its removal, detents on the collar that the washer gets pressed over and then secured on the plug thereby, ball and detent configurations, etc.). In fact in other embodiments, the washer (930) may be formed integrally with the plug (920) so long as the washer (930) continues to allow the appropriate amount of deflection required to allow the necessary movement of the pin (940) to take place (e.g., to allow the above described cam or camming action to take place). If desired, the fastener could be designed such that the plug with integral washer could then be interference fit into the cup (910). In still others forms, the washer may be replaced with a threaded cap that screws onto the collar (928) and provides a surface for capturing the pin (940) while still allowing for deflection (e.g., if the fastener nut is not setup with the pin to deflect).

This fastener should not be restricted to an oil plug only but could be used to create a vibration resistant leak-proof plug for many applications where tools are not required to lock and release the plug. For example, any application where plugs may be desired to prevent leaks, such as live bait wells, boat wells, fluid container openings, etc. In a preferred form, however, the plug will be used in applications where the fluid opening is threaded or in conjunction with items that help thread such openings. It should also be appreciated that the plug shown here uses a centered pin (910) but could also use an off centered pin similar to FIG.

2A-M where the pin could be removed and the plug orientation to the cup can be reoriented one of several positions.

Another exemplary embodiment of a fastener for obstructing or plugging an opening is illustrated in FIGS. 16A-K. Like the plug illustrated in FIGS. 15A-E, the plug in FIGS. 16A-K includes an outer member, such as a cup or sleeve, an inner member, such as an insert, a biasing member, such as a spring washer, and an actuator, such as a handle or pin. In keeping with the above practice, items in the embodiment of FIGS. 16A-K that are similar to items in earlier embodiments will be referenced using the same latter two-digit reference numeral, but adding a different prefix, (e.g., prefix 16), in order to distinguish this embodiment from prior embodiments. Thus, the outer member is referenced as (1610), the inner member is referenced as (1620), the biasing member is referenced as (1630) and the actuator is referenced as (1640).

In the form illustrated in FIGS. 16A-K, the fastener uses a centered actuator (1640) that is arcuate in shape and has distal ends 1644 that are disposed or nested in mating recesses within the outer body 1610, such as pockets 1614, which define openings 1612 in the outer body 1610 into which the distal ends of handle 1640 are inserted. At least one of the distal ends 1644 includes a cammed surface that allows the actuator 1640 to be used to deform the biasing member 1630. In a preferred form and in the form illustrated, both of the distal ends 1644 of actuator 1640 have cammed surfaces, such as D-shaped surfaces illustrated in FIGS. 16A-K, and are located on opposite sides of plug insert 1620. The actuator 1640 operates in a manner similar to the actuator 940 of FIGS. 15A-E and for this reason such operation will not be repeated here for purposes of brevity and to avoid redundancy. Unlike the prior embodiment of FIGS. 15A-E, however, the fastener illustrated in FIGS. 16A-K includes a plurality of seals for helping the fastener make a fluid-tight seal when inserted into an opening.

More particularly, the fastener includes a first seal, such as O-ring 1690, and a second seal, such as O-ring 1692. The first O-ring 1690 operates similar to O-ring 990 in FIGS. 15A-E, but is at least partially disposed within a channel or recess 1626 defined by a lower or downward facing surface of outer body 1610, rather than being located in the insert 1620 as is done in FIGS. 15A-E. Thus, the fastener makes a first sealing engagement between the portions of the first seal 1690 that extends downward from channel 1626 and the work piece or work piece surface to which the fastener is connected. The second O-ring 1692 is disposed on the insert 1620 and, preferably, is positioned within a channel or recess 1622 defined in an outer annular surface of insert 1620 somewhere between the upper and lower ends of the insert 1620. In the form illustrated, the second O-ring 1692 is positioned generally about a mid-point of insert 1620 and, in some respects, serves as a back-up seal preventing fluid from traveling through the fastener; however, in a preferred form it should be understood that the second seal's primary function is rather that of a second biasing member or friction member urging the fastener into its first or engaged position wherein the mating structures of the insert and outer body are engaged with one another.

Like the prior embodiment of FIGS. 15A-E, the outer body or sleeve 1610 and first biasing member 1630 define inner openings 1612 and 1632, respectively, and insert 1620 includes a connecting or fastening member, such as inner collar or tubular collar 1628, which is sized to pass through the opening 1632 of biasing member 1630 so that the collar 1628 can be deformed, upset or bucked to secure the biasing member 1630 to the inner body or insert 1620. Unlike prior embodiments, however, the fastener of FIGS. 16A-K further includes a repositioning or reorienting mechanism that allows the outer body 1610 and actuator 1640 to be moved independent of the insert 1620 and the insert 1620 to be moved independent of the outer body or sleeve 1610 and actuator 1640.

In one form, at least one of the outer body or sleeve 1610 and insert 1620 includes one or more male mating members, such as protrusions, and the other of the outer body/sleeve 1610 and insert 1620 includes one or more mating female members or structures. In some embodiments the outer body/sleeve 1610 and insert 1620 may have a plurality of male mating structures and mating female structures, such as alternating male and female structures that correspond with alternating female and male structures on the other structure. In other forms, the outer body/sleeve 1610 may have one mating structure (i.e., male or female) and the insert 1620 may have one corresponding mating structure (i.e., female or male). It should be understood that many different configurations and/or combinations of mating male and female structures are contemplated and intended to be covered by this disclosure.

In the form illustrated in FIGS. 16A-K, one exemplary embodiment of such a repositioning mechanism is disclosed. In this form, insert 1620 includes male mating members 1625 extending from a surface or surfaces thereof, and outer body/sleeve 1610 defines mating female members 1618 configured to receive the male mating members 1625. When the fastener is in its normally biased first or engaged position (see FIG. 16F), the mating members 1625, 1618 are engaged or mated with one another and prevent the insert 1620 moving separate and apart from the outer body 1610 and actuator 1640. When the fastener is in its second or disengaged position (see FIG. 16I), the mating members 1625, 1618 are disengaged from one another and allow the insert 1620 to move independently of the outer body 1610 and actuator 1640 and, in some forms, this allow the outer body 1610 and actuator 1640 to move independent of the insert 1620 and the insert 1620 to move independent of the outer body 1610 and actuator 1640. In other words, in the first position the mating members 1625, 1618 force the insert 1620 and outer body/actuator to travel in unison. Whereas, in the second position the mating members 1625, 1618 allow the insert 1620 and outer body 1610 to move freely and independent of one another. In alternate forms, it should be understood that the fastener may be configured so that only one of the insert 1620 and outer body/actuator are moveable with respect to the other.

In FIGS. 16A-B, mating male structures 1625 are shown formed in the insert 1620 before it is assembled to the outer sleeve or body 1610 and biasing mechanism 1630, however, this is simply for convenience and not an accurate depiction of what this product would look like prior to production or assembly. Rather, the male mating structures 1625 would not be formed until the insert is disposed within the outer sleeve member 1610 so that the insert 1620 can fit fully through opening 1616. This configuration also prevents the insert 1620 from being inadvertently removed from outer body 1610 (or the outer body 1610 from being removed from the insert 161). More particularly, after the insert 1620 is disposed in outer body 1610, a portion of the insert 1620 is deformed to prevent inadvertent removal of the insert from the outer body and vice versa. It also should be understood that the inner collar or tubular rivet 1628 would also be deformed or bucked after the collar 1628 is disposed in the opening 1632 of biasing member 1630. In alternate forms, the outer body 1610 may define openings that the male mating members 1625 can be aligned with to allow for the removal of the insert 1620 from the outer body or sleeve 1620 if desired.

Turning now to a more detailed look at the repositioning or reorienting mechanism of FIGS. 16A-K, in the form illustrated, the repositioning mechanism further includes a two stage outer body or locking sleeve 1610 with one stage or portion 1617 defining an opening with a first inner diameter and a second stage or portion 1616 defining an opening with a second inner diameter different than the first inner diameter and, preferably, smaller than the first. The smaller inner diameter stage 1616 is preferably sized such that the male mating structures 1625 cannot fit through the opening of inner diameter portion 1616. In the form illustrated, the insert 1620 is similarly staged having a first portion defining a first outer diameter and a second portion defining a second outer diameter different from the first and, preferably, smaller than the first outer diameter. Thus, both the outer body 1610 and insert 1620 have stepped configuration and, preferably corresponding stepped configurations.

Figure 16D:
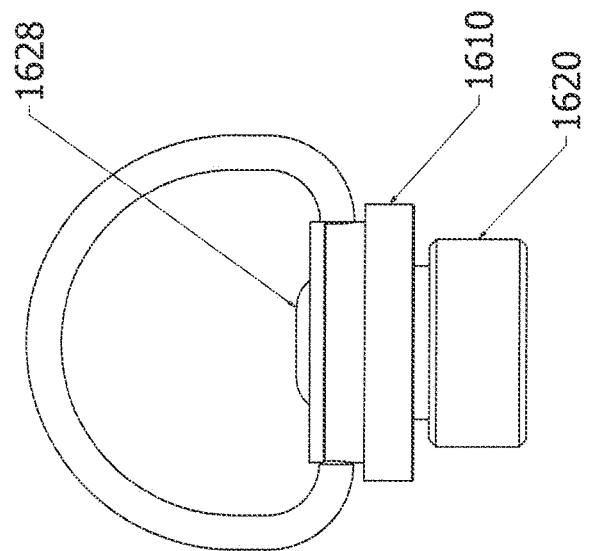
FIGS. 16D-F are front elevation, plan and cross-section views, respectively, of the plug of FIGS. 16A-C, with the cross-section being taken along line F-F in FIG. 16E and illustrating the fastener in the first or engaged position wherein the corresponding mating structures of the outer body and insert are engaged with one another so that the outer body and insert move or travel in unison (for convenience, the sealing members have been removed to make their respective channels or recesses more readily visible)
Figure 16C:
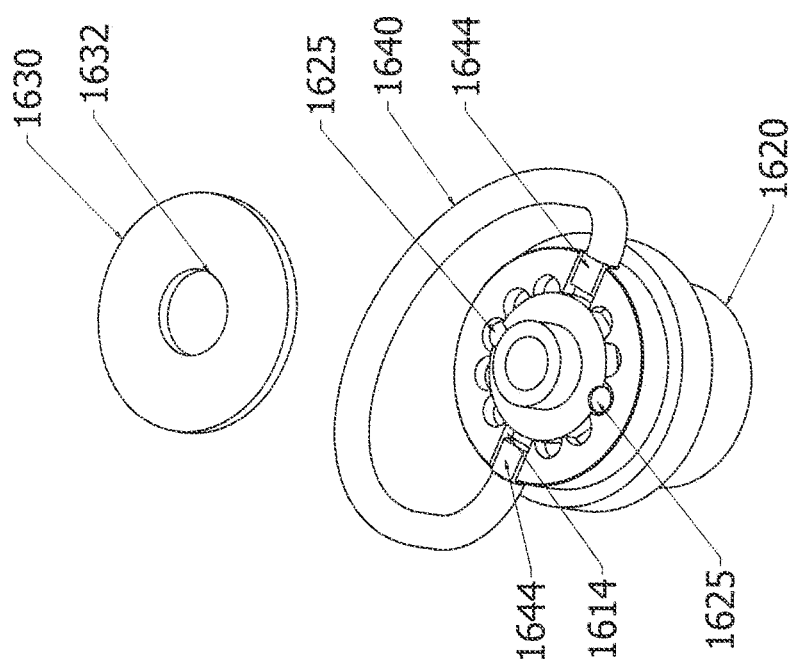
FIG. 16C is a perspective view of the plug of FIGS. 16A-B showing the plug partially assembled, but with the biasing member or spring washer exploded from the remainder of the assembly so as to illustrate how the corresponding mating structures of the outer body or cup/sleeve and the insert mate or engage one another when in the fastener is in the first or engaged position so as to move in unison with one another.
Figure 16H:
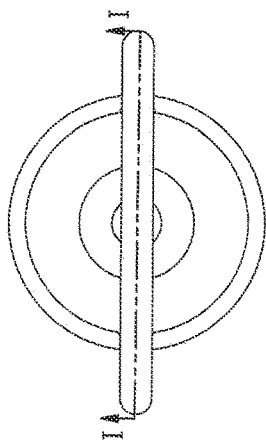
FIGS. 16H-I are plan and cross section views, respectively, of the plug of FIGS. 16A-G, with the cross-section being taken along line I-I in FIG. 16H and illustrating the fastener in the second or disengaged position wherein the corresponding mating structures of the outer body and insert are disengaged from one another so that the outer body and insert are movable independent of one another so that the outer body and actuator handle or pin may be repositioned or reoriented with respect to the insert (again the sealing members or O-rings have been removed to make their respective receptacles more easily visible)
Figure 16I:
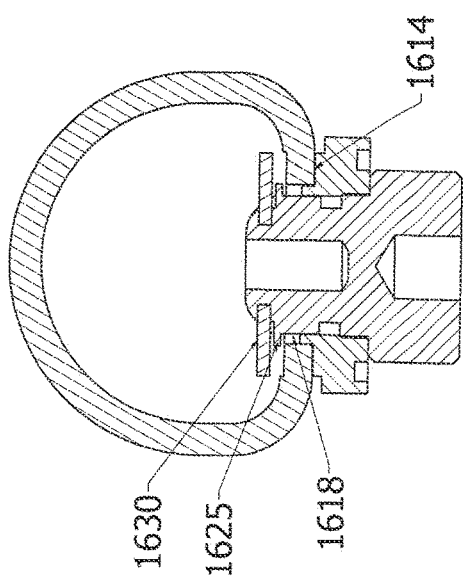
Figure 16G:
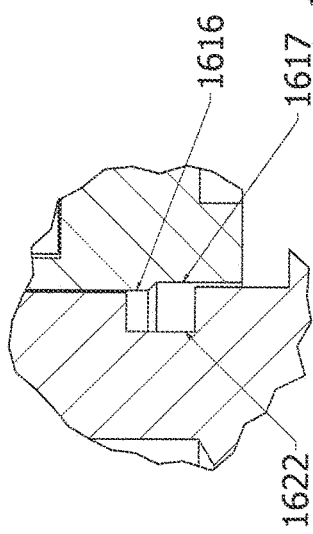
FIG. 16G is an enlarged view of portion G in FIG. 16F illustrating the larger reduced diameter portion of the outer body or cup/sleeve that the second seal member or O-ring (not shown) may be moved into when the actuator or pin handle is moved to a second or disengaged position.
Figure 16E:
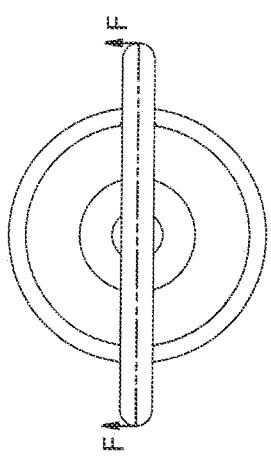
Figure 16F:
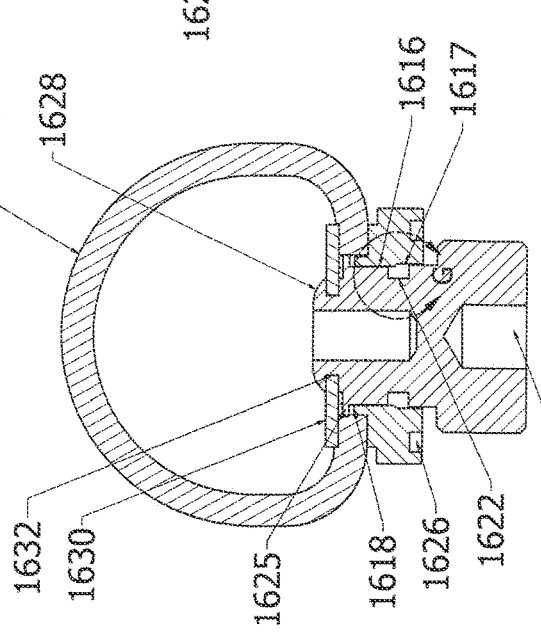

As best illustrated in FIGS. 16F, G and I, second biasing mechanism or O-ring 1692 is allowed to fill the larger opening existing between the channel 1622 and larger inner diameter stage 1617 of outer body 1620 (see FIGS. 16F-16G) when the fastener is in the first or engaged position. However, when the fastener is moved toward and/or into the second or disengaged position, the second biasing mechanism or O-ring 1692 is forced to occupy the smaller opening existing between the channel 1622 and smaller inner diameter stage 1616 of outer body 1620 (see FIGS. 16G and 16I). In the form illustrated, the second biasing mechanism 1692 is made of a malleable material like fluoroelastomers, buna-nitrlile, urethanes, or the like so that it can be deformed to fit within the smaller opening between channel 1622 and inner diameter portion 1616 when the fastener is in the second or disengaged position and return to its normal or natural shape when the fastener is in the first or engaged position. It is this deformation that causes the second biasing member 1692 to urge or bias the fastener into the first position. Although the O-rings 1692 and 1690 have been removed from FIGS. 16F, 16G and 16I to make the O-ring channels or receptacles more visible, it should be clear that the second O-ring largely fills the opening defined by the channel 1622 and larger inner diameter portion 1617 and is thus forced to deform to fit into the second opening defined by the channel 1622 and smaller inner diameter portion 1616. In the form illustrated, a portion of the O-ring 1692 remains in the opening defined by channel 1622 and larger inner diameter portion 1617 when the fastener is moved into the second or disengaged position due to the fact the O-ring is slightly larger than the opening defined by channel 1622 and smaller inner diameter portion 1616.

FIGS. 16I and 16J best illustrate how the mating members 1625 and 1618 disengage from one another when the fastener is moved into the second or disengaged position. More particularly, male mating members 1625 are moved from a first position wherein the male mating members 1625 rest in the recesses 1618 defined by outer body 1610 to a second position wherein the male mating members 1625 are moved to a position of clearance above the recesses 1618 so that either the insert 1610 can move freely with respect to the outer body 1620 or the outer body 1620 can move freely with respect to insert 1610. In a preferred form, the latter is considered the primary concern (i.e., moving the outer body 1620 with respect to the insert 1610) as this allows the user to reposition or re-orient the position of actuator handle 1640 when the insert 1610 is connected to one or more work pieces or a work surface. This allows the fastener of FIGS. 16A-F to offer ways in which the fastener can be adjusted or altered without tools in order to accommodate particular users (e.g., left handers, right handers, those with injuries or limitations, etc.) and/or to accommodate the particular application or environment the fastener is used in (e.g., the particulars with respect to the surrounding environment, such as if it is a tight working space or if obstructions are present, etc.).

In FIG. 16K, vertical arrows indicate that an upward force may be applied to the plug insert 1620 or to the actuator 1640 in order to move the fastener from its normally biased first or engaged position toward, and eventually into, the second or disengaged position. Once this is done, the horizontal arrow illustrates how the outer body 1610 and actuator handle 1640 can be rotated with respect to insert 1620. Thus, in operation, a user could pull up on actuator handle or pin 1640 to exert the required force to move the fastener into the second disengaged position. Alternatively, the inner body or insert 1620 can be pushed up in order to exert the required force to move the fastener into the second disengaged position.

In addition to showing how the fastener can be operated, FIG. 16K also illustrates an optional cover 1670 that may be used with the fastener. The cover may be used to protect the biasing member 1630, the repositioning mechanism and/or the joint between actuator 1640 (specifically distal ends 1644) and outer body 1610 (specifically bed 1614 and opening 1612) from debris so that operation of these components is not interfered with or hampered in any way. The cover may also be used to provide a local for indicia or other form of marking. For example, trademarks and or product specifications, such as dimensions or size data may be provided on cover 1670. In addition, cover 1670 may be color coated for any of a variety of reasons. For example, different sized products such as plugs may be color coated in order to make it easier for consumers to locate or identify the correct part or replacement part or to reduce the risk a consumer will inadvertently purchase the wrong product. In addition or alternatively, covers of different colors may be provided to match a trade dress that is desired for the fastener product for a particular application or to simply match the color of the surrounding environment of the particular application. In some instances color may be chosen to purposely not match the surrounding environment so that the fastener purposefully sticks out and makes it easier for the user or consumer to locate the fastener in certain applications. In yet another example, the cover 1670 may be used to allow for a more aesthetic appearance relating to a particular application.

In one exemplary embodiment, the fastener of FIGS. 16A-F is used as a fluid drain plug, such as an oil drain plug for a vehicle or machine or a boat drain plug (e.g., bilge, well or hull plug) for a boat or vessel. Such a fastener would replace existing fluid drain plugs for such applications which require the use of tools and often are located in tight or cramped work spaces and in applications that expose such plugs to vibration (e.g., automobile, motorcycle and tractor applications), with the quick-release fastener of FIGS. 16A-F which can be operated without tools and is better suited for applications that expose such plug fasteners to vibration.

The fastener of FIGS. 16A-K may include additional features for use in specific applications. For example, in the oil drain plug application discussed above, the fastener may be configured with an opening 1629 (see FIG. 16B) in the insert to accommodate a magnet, such as a rare earth magnet, so that magnetic fragments in the fluid retained by the drain plug (such as metal shavings or iron wear dispersed in oil) will be drawn to and connected to the magnet to effectively filter this debris out of the retained fluid. The material chosen for the accessory will preferably be selected based on the intended application. Thus, for high temperature applications such as oil drain plugs, high temperature rare earth magnets will be used so the high temperatures do not negatively impact the magnet (e.g., demagnetize the magnet, weaken the magnetization, soften the material, etc.). In alternate forms, the opening 1629 may be used to allow for a different means of fastening the biasing member 1630 to the insert 1620 and/or to allow for additional components to be made using the general configuration of the fastener of FIGS. 16A-K. For example, in some forms a threaded shank may be inserted into opening 1629 so that the fastener operates like the screw type fasteners discussed above. In other forms, the opening 1629 as well as inner diameter of outer member 1610 may also be threaded so that the fastener of FIGS. 16A-K can be used like the nut type fasteners discussed above or so that the fastener can be disassembled and used in different manners (e.g., used as a plug in some applications, used as a nut in other applications by such as by using the internally threaded opening 1629 or by removing the insert 1620 and using the internally threaded outer member 1610, etc.). In still other applications, opening 1629 may be used without any accessory to simply reduce the weight and/or material expense associate with the fastener.

Turning now to FIG. 17, in which there is illustrated yet another embodiment of a fastener in accordance with the invention, the fastener being a ratchet type fastener. In keeping with above practice, items that are similar to those discussed above will use similar latter two-digit reference numerals but include the prefix "17" to distinguish this embodiment from others. Thus the fastener outer body will be referenced as 1710, insert will be referenced as 1720 and actuator will be referenced as 1744, etc. Items the operate in manners similar to those discussed above will not be referenced in order to avoid duplicity, but it should be understood that prior descriptions of items and operation of similar items in prior embodiments equally applies to this embodiment as it has with several prior embodiments.

Unlike prior embodiments, the fastener of FIG. 17 includes a ratchet mechanism for alerting a user or consumer as to when the fastener has been tightened a sufficient amount so that the user knows to stop rotating or tightening the fastener and simply move the actuator 1740 from its unlocked or unsecured position (i.e., when the actuator handle 1740 is positioned vertical or perpendicular to the plane or planes containing the upper surfaces of insert 1720 and outer sleeve or body 1710) to its locked or secured position (i.e., when the actuator handle is pivoted so that the actuator handle is generally parallel to the plane or planes containing the upper surfaces of the insert 1720 and outer sleeve 1710). Such pivoting or rotation of the actuator 1740 causes the D-shaped portion 1744 of the actuator to move from the position where the flat side of the D-shaped portion 1744 is facing up toward the biasing spring 1730 to a position wherein the cam of the D-shaped portion 1744 engages the biasing spring 1730 to exert downward force on the fastener and secure the fastener to the work pieces or work piece/work surface to which the fastener is connected.

In the form illustrated, the ratchet mechanism includes a gear 1727 mounted on insert 1720 and pawl 1718 mounted on outer body or sleeve 1710. More particularly, the gear 1727 and pawl 1718 are mounted on the upper surfaces or upward facing surfaces of insert 1720 and sleeve 1710, respectively. The pawl 1718 includes a protrusion which, in the form illustrated, is of a simple wire configuration 1780. The positioning or orientation of the pawl 1718 is such that it only allows rotation of the outer body 1710 and actuator 1740 in a first direction, and prevents rotation of the outer body 1710 and actuator 1740 in a second direction, opposite of the first direction. In a preferred form, the ratchet fastener further includes a repositioning mechanism or configuration similar to that of FIGS. 16A-K so that the repositioning mechanism can be moved from a first position which it is normally biased in and wherein the body 1710/actuator 1740 and insert 1720 cannot be move independent of one another, to a second position wherein the body 1710/actuator 1740 and insert 1720 can be moved independent of one another.

Thus, in FIG. 17 a ratcheting and/or audible fastener is provided that makes it easy for a user (e.g., consumer) to determine when the fastener has been secured to a work piece a sufficient amount so that the user knows to stop rotating the fastener and simply move the actuator pin or handle 1740 from its unlocked or unsecured position to its locked or secured position. The ratcheting fastener can provide audible feedback and/or tactile feedback to a user to help the user understand when the fastener has been sufficiently coupled or uncoupled to a work piece or work pieces. As mentioned above, in some forms, the ratcheting fastener is even configured to allow rotation in only one direction to further simplify operation of the fastener for the user.

Yet another embodiment of an exemplary fastener in accordance with the invention is illustrated in FIGS. 18A-D. In this embodiment, a multi-piece outer body or sleeve is disclosed having a first outer body member 1810 and a second outer body member 1819. Like prior embodiments, the fastener further includes an insert 1820, biasing member 1830, and actuator 1840. Unlike prior embodiments, however, the two-part structure of the outer body may allow for the fastener to be provided with components made of multiple different materials. Thus, this configuration allows for the fastener to be customized or improved (or even perfected) for specific applications. For example, in some applications a very inexpensive plug may be desired due to the fact the plug is not subjected to harsh forces. In fact, the only major harsh aspect of the application may be the wear associate with operation of the cam lever or actuator 1840. With the multi-piece configuration provided in FIGS. 18A-D, the insert 1820 and first outer body member 1810 may be provided in an inexpensive plastic (e.g., polyethylene) while the second outer body member 1819, actuator 1840 and biasing mechanism 1830 may be provided in metal to account for the wear these items face when transitioning the fastener between the cam lever locked and unlocked positions.

As another example, the multi-piece structure of FIGS. 18A-D may also allow the fastener to be made of different forms of material specific for the application and/or preferred for the application. For example, in high temperature applications, certain components of the fastener may be chosen for their ability to withstand the temperatures that portion of the component will be subjected to in its intended application. Similarly, in the boat hull plug applications mentioned above, the portion of the fastener that is exposed to brine or saltwater may be selected of a certain type of metal while the remainder of the component is made-up of a less expensive metal. In yet another example, the oil drain plug mentioned above may have the insert made of a less expensive metal and the outer body or optional cap made of a more expensive material (e.g., chrome, anodized aluminum, brushed stainless steel, etc.).

Thus, it should be understood that numerous types of fasteners are disclosed herein and contemplated in view of this disclosure. For example, a plug type fastener is disclosing having an outer body, and inner body, a first biasing mechanism coupled to an actuator for exerting force on the inner body to secure the fastener in place when the fastener is coupled to a work piece and the actuator is moved from a first position toward a second position. The fastener having a first seal disposed at least partially within the outer body for creating a sealing engagement between the fastener and a work surface to which the fastener is connected. The fastener also having a repositioning mechanism moveable between a first engaged position wherein the outer body and inner body move only in unison with one another and a second disengaged position wherein the outer body and inner body are moveable independent from one another or at least the outer body is moveable with respect to the inner body so that at least one of the outer body and actuator are moveable with respect to the inner body. In one form, the fastener includes a second biasing mechanism positioned between the outer body and inner body for biasing the repositioning mechanism in the first engaged position. In another form, a multi-part fastener is provided have a first member, a second member positioned within the first member, a third member coaxially aligned with the first member, and a first biasing mechanism coupled to an actuator for exerting force on the second member to secure the fastener in place when the fastener is coupled to a work piece and the actuator is moved from a first position toward a second position. Such a multi-piece fastener can be customized for a particular application by selecting specific materials for the separate components that are desirable for that portion of the fastener given the intended application. In other forms, any of the above embodiments may be provided with an optional cover that has a generally flat planer top that provides sufficient surface area for marking the fastener with markings that indicate something about the fastener (e.g., trademark, size or dimensions of part, color coding to represent trade dress or fastener size or intended use, designs, etc.).

It should be appreciated that any of the features of the embodiments discussed above may be combined to form further embodiments. It should also be understood that descriptions of features similar to those already discussed have been abbreviated so as not to be repetitive or redundant. Thus, descriptions from one embodiment can and likely do apply to similar structures on other embodiments.

It should also be appreciate that associate methods for manufacturing, assembling and customizing fasteners like those discussed above are also contemplated herein. For example, a method of customizing a fastener using specific designs (including color alone) to denote a property of or intended use for the fastener is disclosed herein. Similarly, method of manufacturing non-marring and abrasion resistant fasteners are disclosed herein, as are methods for manufacturing ambidextrous fasteners. Methods of manufacturing and using two piece fractional term connectors, simplistic washer, insert, sleeve and cam actuated fasteners, and fluid plugging devices are also disclosed and claimed herein. In addition, methods of manufacturing or providing two-piece, fractional turn, quick-release, plug, reorientable, ratcheting and/or audible or tactile feedback type and polymaterial fasteners are also provided herein, as are methods of securing or using such fasteners. Methods of marking fasteners with various designs, marks, indicia and the like are also disclosed as are methods of identifying and/or distinguishing fasteners using color, indicia, marks and similar markings.

Thus, it is apparent that there has been provided, in accordance with the invention, a fastener and methods relating to same that fully satisfy the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A fastener comprising:
a first body defining at least one recess;
a biasing mechanism positioned proximate the first body, adjacent the at least one recess and movable between a first position and a second position;
a second body coupled to the first body and the biasing mechanism to form an assembly; and
an actuator having first and second ends and a gripping portion therebetween movable between a locked position to further secure the fastener and a released position, with at least one of the first end and second end disposed within the recess between the first body and the biasing mechanism, wherein at least one of the first end and second end includes a camming surface, with the camming surface engaging and driving the biasing mechanism into the second position when the actuator is in the locked position and the camming surface not engaging and driving the biasing mechanism into the second position when the actuator is in the released position, wherein at least one of the first and second ends of the actuator having a substantially D shaped cross section thereby defining a substantially flattened portion and a substantially curved portion which is the camming surface, wherein when the actuator is moved to the locked position, the substantially flattened portion rotates to a position substantially non-parallel to the biasing mechanism thereby engaging the biasing mechanism with the substantially curved portion to move the biasing mechanism toward the second position and exerting a substantially downward force on the first body further securing the fastener.

2. The fastener of claim 1 wherein the biasing mechanism is a spring washer normally biased in the first position and is deflected in the second position by the camming surface of the actuator when the actuator is in the locked position.

3. The fastener of claim 1 wherein the second body includes a connector extending from an upper surface thereof that couples the biasing mechanism to the second body.

4. The fastener of claim 3 wherein the connector is a deformed collar that forms a rivet connection between the biasing mechanism and the second body.

5. The fastener of claim 3 wherein the second body is an cylindrical structure at least partially internally threaded and having first and second ends with a tubular protrusion extending from the first end and a keyed portion on the second end that mates with a mating structure in the first body, the biasing mechanism being a spring washer positioned on the tubular protrusion of the first end of the second body and coupled thereto by a deformed distal end of the tubular protrusion, with both the first and second ends of the actuator disposed in the recess of the first body and captured between the first body and the spring washer.

6. The fastener of claim 1, wherein the locked position is when the actuator is in a down position with the gripping portion positioned off to a side of the fastener.

7. The fastener of claim 1 wherein both the first and second ends of the actuator have a substantially D shaped cross section.

8. The fastener of claim 1 wherein at least one of the first and second ends has a cross sectional width greater than a cross sectional height.

9. The fastener of claim 8 wherein the actuator causes the distance between the biasing mechanism and the first body to increase as the actuator is moved to the locked position.

10. A fastener comprising:
 a first body defining at least one recess;
 a biasing mechanism positioned proximate the first body, adjacent the at least one recess and movable between a first position and a second position;
 a second body coupled to first body and the biasing mechanism to form an assembly; and
 an actuator having first and second ends and a gripping portion therebetween movable between a locked position to further secure the fastener and released position, with at least one of the first end and second end disposed within the recess between the first body and biasing mechanism, wherein at least one of the first end and second end includes a camming surface, with the camming surface engaging and driving the biasing mechanism into the second position when the actuator is in the locked position and the camming surface not engaging and driving the biasing mechanism into the second position when the actuator is in the released position, wherein both the first and second ends of the actuator have a substantially D shaped cross section having a substantially flattened portion and a substantially curved portion which is the camming surface, the at least one of the first and second ends thereby having a cross sectional width greater than a cross sectional height of the at least one of the first and second ends, the actuator being in the released position causing the substantially flattened portion to be substantially parallel with the biasing mechanism, wherein when the actuator is moved to the locked position, the substantially flattened portion is rotated to be non-parallel to the biasing mechanism thereby engaging the biasing mechanism with the substantially curved portion to exert a downward force on the fastener.

* * * * *